(12) United States Patent
Supikov et al.

(10) Patent No.: US 12,736,915 B2
(45) Date of Patent: Sep. 15, 2026

(54) HOLOGRAPHIC IMAGE PROCESSING WITH PHASE ERROR COMPENSATION

(71) Applicant: Intel Corporation, Santa Clara, CA (US)

(72) Inventors: Alexey Supikov, Santa Clara, CA (US); Ronald T. Azuma, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 55 days.

(21) Appl. No.: 17/960,663

(22) Filed: Oct. 5, 2022

(65) Prior Publication Data

US 2023/0043791 A1 Feb. 9, 2023

(51) Int. Cl.
*G03H 1/08* (2006.01)
*G03H 1/22* (2006.01)

(52) U.S. Cl.
CPC ......... *G03H 1/0866* (2013.01); *G03H 1/2294* (2013.01)

(58) Field of Classification Search
CPC .. G03H 1/0866; G03H 1/2294; G03H 1/2202; G03H 2001/0816; G03H 2001/2247; G03H 2210/454; G03H 1/0808
See application file for complete search history.

(56) References Cited

U.S. PATENT DOCUMENTS

| | | | | |
|---|---|---|---|---|
| 5,668,648 A * | 9/1997 | Saito | G03H 1/0841 | 359/9 |
| 2005/0122549 A1* | 6/2005 | Goulanian | G03H 1/0808 | 359/3 |
| 2019/0317451 A1* | 10/2019 | Supikov | G06N 3/045 | |
| 2019/0340736 A1* | 11/2019 | Sobieranski | H04N 23/951 | |
| 2020/0117139 A1* | 4/2020 | Supikov | G03H 1/0402 | |

OTHER PUBLICATIONS

Bolek, Jan et al., "Non-invasive correction of thermally induced wavefront aberrations of spatial light modulator in holographic projection", Optics Express, 10193, vol. 27, No. 7, Apr. 1, 2019.
Chakravarthula, P. et al., "Wirtinger Holography for Near-Eye Displays", ACM Trans. Graph, vol. 38, No. 6, Article 213, Nov. 2019.
Choi, S et al., "Neural 3D Holography: Learning Accurate Wave Propagation Models for 3D Holographic Virtual and Augmented Reality Displays", ACM Trans. Graph., vol. 40, No. 6, Article 240, Dec. 2021.
Li, R. et al., "Progress in Phase Calibration for Liquid Crystal Spatial Light Modulators", Applied Sciences, 2019.
Martinez Fuentes, J. et al., "Interferometric method for phase calibration in liquid crystal spatial light modulators using a self-generated diffraction-grating", Optics Express 14159, vol. 24, No. 13, Jun. 27, 2016.
Zhao, T. et al., "Multi-region phase calibration of liquid crystal SLM for holographic display", Applied Optics, vol. 56, No. 22, Aug. 1, 2017.

* cited by examiner

*Primary Examiner* — Mustak Choudhury
(74) *Attorney, Agent, or Firm* — Hanley, Flight & Zimmerman, LLC

(57) ABSTRACT

A method and system of holographic image processing includes phase error compensation.

24 Claims, 12 Drawing Sheets

Phase Error Gen. 306

SLM Control 102

300

100 d d z

114

112

104

OA

302

304

308

110

$z_0$ $z_1$ $z_2$

108

$f_2$ $f_1$ $f_0$

402

404

406

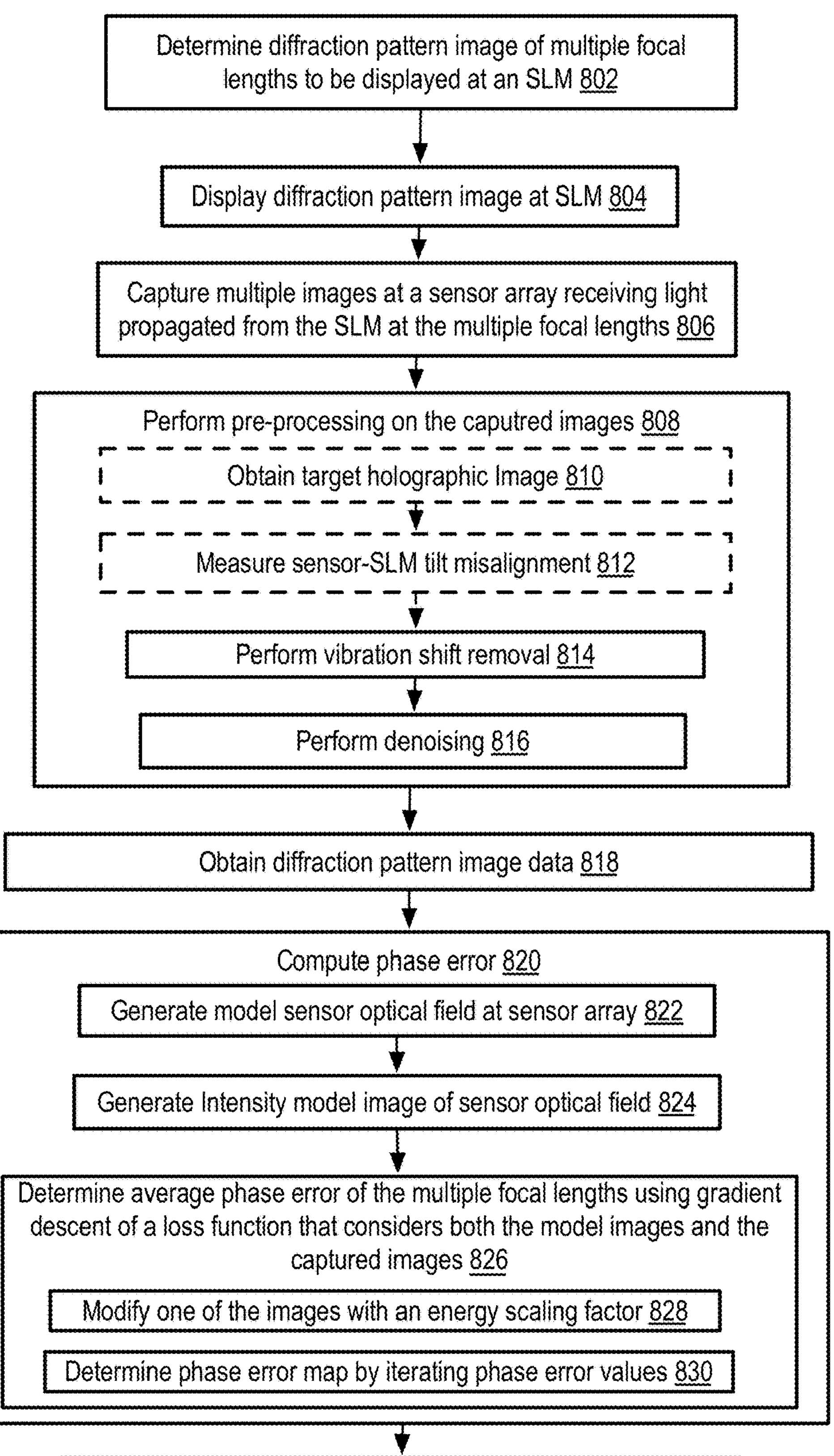
FIG. 8
800
Determine diffraction pattern image of multiple focal lengths to be displayed at an SLM 802
Display diffraction pattern image at SLM 804
Capture multiple images at a sensor array receiving light propagated from the SLM at the multiple focal lengths 806
Perform pre-processing on the caputred images 808
Obtain target holographic Image 810
Measure sensor-SLM tilt misalignment 812
Perform vibration shift removal 814
Perform denoising 816
Obtain diffraction pattern image data 818
Compute phase error 820
Generate model sensor optical field at sensor array 822
Generate Intensity model image of sensor optical field 824
Determine average phase error of the multiple focal lengths using gradient descent of a loss function that considers both the model images and the captured images 826
Modify one of the images with an energy scaling factor 828
Determine phase error map by iterating phase error values 830
Store phase error for subsequent run-time SLM imaging 832

1200

1300

1400

FIG. 15A
1500
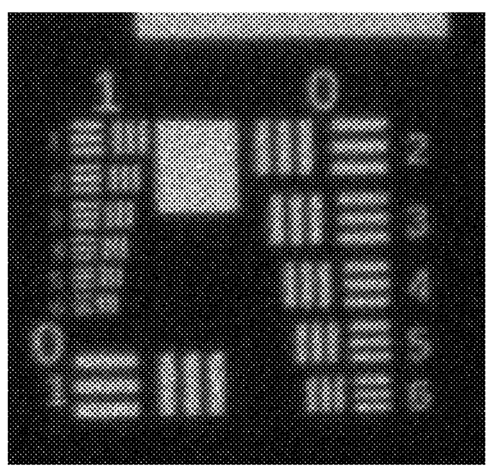
FIG. 15B
1502
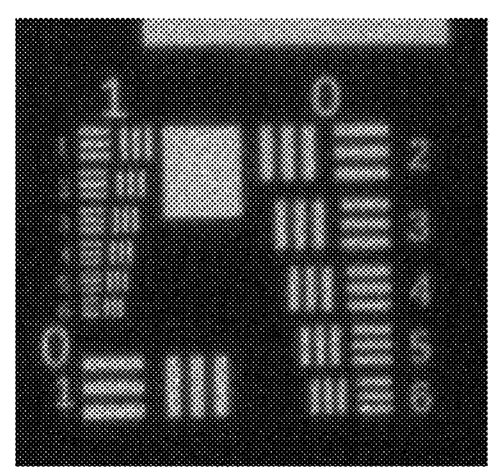
1600 FIG. 16
1700 FIG. 17
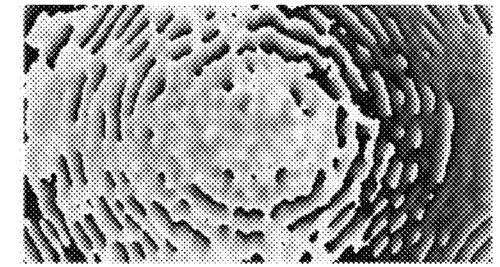
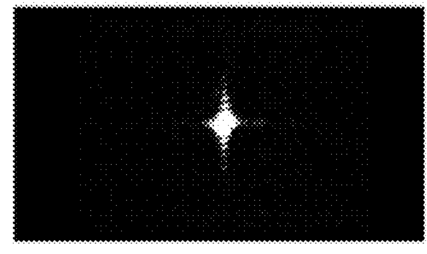
1800 FIG. 18
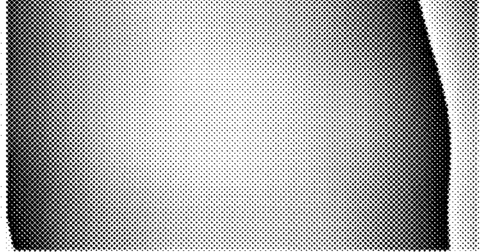
1900 FIG. 19

HOLOGRAPHIC IMAGE PROCESSING WITH PHASE ERROR COMPENSATION

BACKGROUND

Holographic display devices may present holographic images in a variety of applications including automotive heads up displays (HUDs), surface-adaptive home projectors, dynamic digital signage, augmented reality (AR) displays, virtual reality (VR) displays, and others. Such holographic display devices have advantages over other displays including an inherent ability to focus light at different distances, very high light efficiency with relatively unlimited brightness, digitally simulated dynamically focused optics, and small size, to name a few examples. The holographic display devices typically have a spatial light modulator (SLM) that has many small pixels that are capable of modulating phase of light or amplitude. The conventional holographic display devices convert a target image into a holographic diffraction pattern image with particular phase values for individual pixels. In order to change a phase profile of an image at the SLM, the SLM can change the direction of electrically controlled crystal molecules at the pixels according to the diffraction pattern image data. This in turn can individually change the phase of light being reflected at the individual pixels at the SLM when a coherent light source is aimed at the SLM. Such conventional holographic display devices, however, do not sufficiently compensate for phase aberrations or errors resulting in low quality holographic images.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures:

FIG. 8 is a flow chart of a method of determining a phase error for holographic images according to at least one implementation disclosed herein;

FIG. 15A is an image of a test hologram with phase error according to at least one implementation disclosed herein;

FIG. 15B is an image of a test hologram after phase error compensation was performed according to at least one implementation disclosed herein;

FIG. 16 is a captured image without pre-processing according to at least one implementation disclosed herein;

FIG. 17 is an image showing a phase error map with no pre-processing according to at least one implementation disclosed herein;

FIG. 18 is a captured image with pre-processing according to at least one implementation disclosed herein;

FIG. 19 is an image showing a phase error map with pre-processing according to at least one implementation disclosed herein;

DETAILED DESCRIPTION

Figure 1:
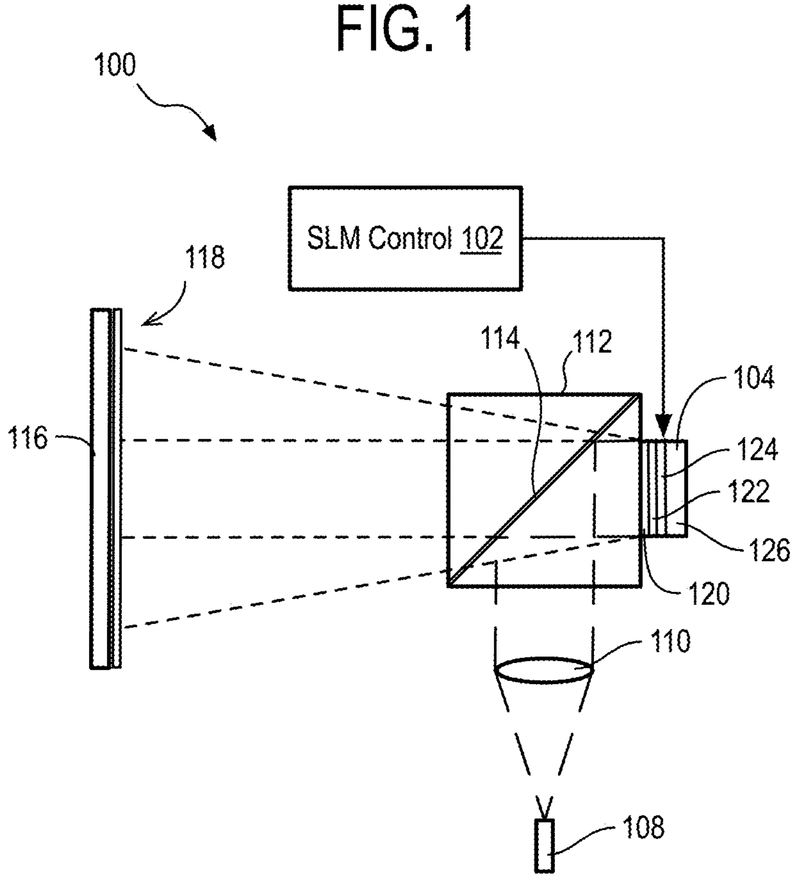
FIG. 1 is a schematic diagram of an example holography display system according to at least one implementation disclosed herein.

One or more implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as computer, a laptop computer, a tablet, set top boxes, game boxes, smart phones, etc., may implement the techniques, systems, components, and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof unless stated otherwise. The material disclosed herein may also be implemented as instructions stored on a machine-readable medium, which may be read and executed by one or more processors. A machine-readable medium may include any medium and/or mechanism for storing or transmitting information in a form readable by a machine (for example, a computing device). For example, a machine-readable medium may include read-only memory (ROM); random access memory (RAM); magnetic disk storage media; optical storage media; flash memory devices; electrical, optical, acoustical or other forms of propagated signals (e.g., carrier waves, infrared signals, digital signals, and so forth), and others. In another form, a non-transitory article, such as a non-transitory computer readable medium, may be used with any of the examples mentioned above or other examples except that it does not include a transitory signal per se. It does include those elements other than a signal per se that may hold data temporarily in a "transitory" fashion such as RAM and so forth.

References in the specification to "one implementation", "an implementation", "an example implementation", and so forth, indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of one skilled in the art to effect such feature, structure, or characteristic in connection with other implementations whether or not explicitly described herein.

Methods, devices, apparatuses, computing platforms, and articles are described herein related to holographic image processing with phase error compensation.

In various contexts, a holographic imaging arrangement or system (or projector) may be employed to display holographic images to a user. The holographic imaging arrangement may include a light source, a spatial light modulator (SLM), various optical elements, and the spatial arrangement of such components. As used herein, the term holographic imaging arrangement indicates an arrangement of any components for the display of a holographic image to a user. The term holographic image indicates any hologram that is displayed to a user including 2D or planar holograms, 3D holograms, or holograms projected onto a screen. Notably, such holographic images can be seen with the naked eye and are generated using interference patterns generated by diffraction of light. Furthermore, a target holographic image is provided for eventual display to the user using the holographic imaging arrangement. The target holographic image, as the name suggests, is the image that is to be shown to the user via the holographic imaging arrangement.

In the context of phase modulation SLMs, a holographic system may have a particular target holographic image to be displayed. The target holographic image data is used to generate a corresponding holographic diffraction pattern (or image) that is provided to, and in turn displayed on, the SLM to propagate light to form the target holographic image. Specifically in image generation, holographic projectors and displays use principles of diffraction and interference to form a desired image that is a distribution of spots of different amplitudes and at desired distances. A typical holographic projector has a coherent light source emitting coherent light through collimation optics and into the SLM, which may or may not be through a beam splitter. The SLM has pixels to spread light due to diffraction. Each pixel has phase set according to phase data from the diffraction pattern image and that forms a per-pixel cone of light delaying the light according to the phase data. Particularly, the phase data is converted into signals to control the orientation of molecules of individual pixels of a liquid crystal layer at the SLM to display the diffraction pattern by modifying the phase of the incident light from the light source. The light then propagated from the SLM then forms the target image (or controlled phase interference pattern, or picture or intensity distribution picture).

Typically, the holographic diffraction image or pattern is generated based on a constrained optimization problem solved by using computer generated hologram (CGH) algorithms that is, in turn, based on the display being implemented and the configuration of the imaging set up of the display as well as the particular holographic image to be displayed (the target image). The diffraction pattern image may be determined by using many different conventional CGH algorithms such as with pre-trained deep neural networks, and/or an iterative processes using a propagation model to determine a final diffraction pattern image data for transmission to an SLM. As mentioned, the diffraction pattern image data includes per-pixel phase data to generate a desired intensity distribution (e.g. holographic image) at a desired location.

The results of the CGH algorithms, however, are often inaccurate because the algorithms assume ideal hardware structure. First with regard to the laser source and collimator, the system assumes the light source is a single ideal point of light with a uniform profile that provides perfectly spherical waves to a collimator that then converts the light into a flat wave with perfectly parallel light rays at every wavelength emitted from the collimator. In reality, however, the light source provides light in a Gaussian waveform, which may or may not be symmetrical, and with a light intensity peak near a center of the curve so that the collimator cannot possibly provide perfectly coherent and parallel light rays with a constant amplitude. These variations add to undesired phase variations of light emitted at the SLM resulting in a blurry target image.

Second with the SLM itself, phase shift of incoming cannot be performed precisely according to the pixel values provided by the diffraction pattern image data. Instead, unavoidable manufacturing tolerances may result in an undesired additional variation in phase (or phase curvature) from a desired phase value in the diffraction pattern. This may be caused by variations in dimensions, such as thicknesses, of the liquid crystal layer itself, a glass layer in front of the liquid crystal layer on the SLM, the mirror behind the liquid crystal layer, and a bonding layer thickness adhering the glass to the liquid crystal layer. Any of these can add further variations to the phase assigned to a pixel on the SLM by the phase data of the diffraction pattern image provided to the SLM.

The result of these manufacturing tolerances in a real holographic system results in various types of phase errors (or aberrations) that severely affect holographic image quality. This includes the non-uniform de-focus which results in blurring, extra speckle noise (or granularity) that results in dots or splotches due to erroneous interference patterns, and contrast ratio (CR) degradation (due to loss of diffraction efficiency). The CR reduction also occurs due to changes in the interference patterns of the light which changes the range of gray scale (or luma) amplitude values on the image, and in turn the total range of brightness (or the contrast ratio) on an image. Therefore, these variations in hardware can result in a very blurry, low quality holographic image, and in turn a poor experience for the user.

Conventional attempts to compensate for phase error so far have been unsuccessful or inefficient. A Twyman-Green interferometer technique measures phase response of the SLM using per-pixel phase response curves for compensation. This technique, however, requires special hardware setups, hardware alignment, and motion compensated optical benches. The error removal process is very memory traffic-hungry since each pixel uses an individual phase response curve. These per-pixel phase response curves also need to be stored as part of factory calibration data thereby increasing memory capacity requirements and memory transaction inefficiency Another conventional approach uses a zonal self-reference technique that displays patterns on the SLM and captures interference pictures to produce per-zone phase response curves. While this technique removes the need for a physical interferometer and alignment, the technique produces per-zone phase response curves that require costly phase error compensation including computations to interpolate four or more phase response curves and on-device storage. This results in low spatial resolution maps since each zone must be at least about 100×100 pixels.

By yet another known approach, a deep neural network (DNN) may be used to explain a deviation between ideal images and actual images produced by a collection of ideal holograms. This method requires a very high computational cost for phase correction during a run-time. This is due to propagation through a phase aberration modelling DNN within the hologram computation loop, which slows hologram computations to be significantly less than real-time, and in turn to be impractical for real-time implementations.

By yet another known phase error removal technique, the technique simulates movement of a camera to multiple display planes to capture three cross-sections of a virtual beam by displaying three different beams each of a different focal length in front of a stationary camera. This includes rescaling the images and then propagating light from an image at one focal length to another focal length in order to simulate a single beam (or single profile). This technique can provide high-resolution additive error maps but has a number of significant defects and inefficiencies. First, this technique requires unrealistically high-quality data which is very difficult, if not practically impossible, to obtain in a factory calibration setup. In other words, the holographic arrangement here must have near ideal camera stability, perfect alignment between the camera and SLM, and noiseless images captured by the camera. If any of these are not achieved, the resulting generated phase error estimates are inaccurate. Thus, obtaining such high quality data in a mass-production environment with this technique is practically impossible. For example, even in a lab environment, any mounting of the different hologram projector components such as the SLM and any pulling on, or shifting of, cables connecting the projector components has been found to cause very small undesired random vibrations or movement that still result in captured data location variations on an image up to +14 μm, which results in erroneous phase error estimates. That method requires near ideal collimated and uniform light source, and thus, cannot compensate for errors caused by light source imperfections, preventing usage of less expensive components for mass production.

In addition, this technique uses very long convergence times. Particularly, this technique finds the phase error by using a multi-plane Gerchberg-Saxton algorithm that requires 5K+ iterations to converge on a solution. This operation can have a duration that lasts for hours because of the numerous propagation steps, and increases the risk of stagnating. Thus, this technique is not practical when thousands of holographic projectors need to be tested individually for phase error magnitudes for example. Also, the rescaling itself requires a very large computational load that slows the process.

Also, this technique results in low-quality estimates. Simulation of different cross-sections of a single beam using multiple beams deviates from physical reality and requires un-necessary resampling steps introducing large estimation errors.

To resolve these issues, the disclosed system and method of holographic image processing with phase error compensation models phase aberrations during a calibration stage and introduced by the system as an additive phase error. Once the phase errors are determined, the phase errors can be subtracted from the phase of an ideal hologram (or in other words, the diffraction pattern image data to be displayed at an SLM during a run-time use of the system).

Specifically during the calibration stage, light may be propagated from the SLM with at least three different focal lengths. By displaying at least three different images each at a different focal length from the SLM, this forms at least three lens profiles or three different beams with one beam each focused in front of, at, and behind a camera sensor array. The multiple focal lengths may be used to provide an averaging effect so that the resulting phase error values are more accurate for a wider range of focal variations of projected images from the SLM. The camera sensor array may capture the three images at a single position regardless of the differences of focal length. The captured images represent the actual or measured images that include actual phase errors. The captured images may be compared to non-ideal theoretical model images that include modeled unknown phase errors to be determined. In order to generate the model images, The model images are generated by using diffraction pattern image data that was used to project a diffraction pattern image that was captured to form the captured images at the multiple focal lengths. The diffraction pattern image data, including phase profiles and amplitudes, form an SLM optical field. The SLM optical field may be input into a convolutional Fresnel (or angular spectrum) diffraction-based optical field propagation model to generate a non-ideal, model, sensor optical field that includes the phase error (or just sensor optical field). The sensor optical field can be converted into an intensity image to form the model image that includes phase errors.

A gradient descent algorithm can then be applied to a loss function to capture deviations of the captured images and deviations from theoretical predictions of the model image where the deviation indicates the presence of phase error across multiple focal planes. By one form, the gradient descent algorithm is operated by using complex-number-based Wirtinger derivatives in addition to other gradient-descent algorithms. The gradient descent algorithm can output an average deviation across the multiple focal planes as a phase error for a pixel location of the SLM lens relative to all (or substantially all) pixel locations on a display represented by the camera sensor array. The new phase errors determined from the previous iteration can be input into the SLM optical field to generate a more accurate model image for each subsequent gradient iteration. This is repeated until the output of the loss function being used (or phase error values being generated) reach a criterium of acceptable optimum solution.

The phase errors can be collected into a phase error map with a phase value for each or individual pixel of a display. The final or output phase error map can be stored on a holographic device with the SLM or otherwise be accessible to the holographic device. During run-time use, once the phase values for a diffraction pattern image are generated (based on the target image), the phase error can be subtracted from the displayed hologram, or in other words, from the phase values of the diffraction pattern image before the diffraction pattern image is provided to the SLM for display on the SLM. This arrangement of phase error compensation provides significantly better quality holographic images much closer to the ideal target image in a very efficient manner so that real-time holography still can be performed. By one example form, the phase correction requires only one subtraction operation per pixel per color component during run-time and only one value per pixel per color component stored as part of calibration data.

To better ensure high quality results, pre-processing operations may be performed on the captured images before using the captured images in the gradient descent-type operation. For example, an optional tilt alignment may be performed to either better align the optical axis of the sensor array with the optical axis of the SLM or to compensate for such a tilt misalignment. The pre-processing also may include a vibration-compensation stage and de-noising stage. The vibration-compensation stage aligns the image content of multiple images of the same focal length to a single image so that the same pixel locations of the image content, such as a spot, on the multiple images have the same or sufficiently similar image content. In order to have spots large enough to be sufficiently differentiated from image to image during the gradient descent, the focal lengths should be relatively long (0.5 to 1.0 meters for example). The captured spot occupies a large area of the image containing zones of very high and very low brightness. Low brightness locations carry useful information that should be used. So, measurements are typically done in high dynamic range camera mode with 12 bit or 16 bit grayscale levels. The exposure time is very short to minimize spot blur caused by vibrations. Such conditions result in increased measurement noise dominated by two components: typical sensor noise and background noise. The latter is caused by parasitic light reflected from various surfaces in the system and surrounding environment. Thus, a denoising stage can be used that performs time averaging over multiple captured images of a same focal length to remove sensor noise. The average background noise is estimated from zones on the time averaged image expected to have no signal, such as at dark corners of the spot image. The average background noise value is subtracted from the time averaged image. This provides a single average captured image for each focal length being used and provided for the gradient descent-type operation.

The disclosed method, system, and holographic projector for phase error compensation is suitable for factory calibration for mass production before the holographic projectors are provided to end users and due to the simplicity in hardware and full automation. The disclosed method, for example, is found to improve the quality of the images by three times (or have one-third of the phase aberrations). This also results in a 128x-256× reduction of factory calibration data storage capacity requirements compared to known systems and with computationally negligible increase in processing time to perform run-time phase error compensation.

Referring to FIG. 1, an example holographic imaging arrangement (also referred to as a holographic system, device, or projector) 100 is arranged in accordance with at least some implementations of the present disclosure. The projector 100 may be implemented in any suitable form factor device such as a motor vehicle platform, a virtual reality headset platform, an augmented reality headset platform, a personal computer, a laptop computer, a tablet, a phablet, a smart phone, a digital camera, a gaming console, a wearable device, a display device, an all-in-one device, a two-in-one device, and so forth.

The holographic imaging arrangement 100 may include an SLM control unit (or just SLM control or controller) 102 that controls an SLM 104. A light source 108 projects coherent light through collimator optics (or a collimator) 110 and optionally other optics not shown such as a polarizer, and onto a beam splitter 112. The beam splitter 112 reflects the projected light into the SLM 104. The SLM 104 then reflects the light back through a phase-controlled liquid crystal layer on the SLM, back through the beam splitter 112, and to a display or screen 116 to form a holographic image 118 that is visible to a user. By one form, the SLM may be a liquid crystal on silicon (LCoS) SLM.

The SLM control 102 may generate diffraction pattern image data using computer generated hologram (CGH) algorithms as discussed herein for displaying a corresponding hologram (or holographic image 118), or the SLM control 102 may transmit the diffraction pattern image data to another device for display of the hologram. The holographic system 100 may have the SLM control 102 integrated into the same housing, motherboard, system on a chip platform, and so forth, as the other projector and display components. As used herein, the term integrated system indicates a system integrated into at least the same device package or housing.

The light source 108, such as at least one laser light source, light emitting diode (LED), a superluminescent light emitting diode (SLED), and so forth may emit coherent or partially coherent light with a constant phase or uniform phase profile as well as a constant amplitude, or may have reasonably curved (e.g. Gaussian) waveform and known non-uniform intensity profile. There may be one laser for each desired wavelength when the lasers have very small bands.

The beam splitter 112 may have a diagonal splitting or reflection layer 114 and is formed of triangular glass prisms, half-silvered mirrors, coatings, and/or other known optical beam splitting structures.

Although illustrated with respect to SLM 104, any suitable holographic imaging device may be employed that displays a diffraction pattern image. By one example form, the SLM 104 may have a glass layer 120 that covers a liquid crystal film or layer 122, which in turn is above a mirror or mirror layer 124. These layers may be supported by a substrate 126. The materials and structures of these layers are well known. The SLM 104, based on the diffraction pattern image data received from the SLM control 102, generates a corresponding diffraction pattern image within a surface layer of the SLM 104 such as at the liquid crystal layer 122. For example, the SLM's liquid crystal film 122 may be pixelated (alterable at a pixel level) to provide a modulated image surface representative of diffraction pattern image data. The SLM 104, or more precisely the liquid crystal film 122, may include any number of pixels and have any size. For example, the SLM 104 may have 3, 4, or 6 micron pixels in liquid crystal film 122 and the liquid crystal film 122 may be about 12×12 mm to 15×15 mm in surface area, although any pixel size and surface layer 204 area size may be employed.

Furthermore, liquid crystal (LC) layer 122 modulates phase of the incident coherent light from the light source to generate the holographic image 118. Specifically, the diffraction pattern image data including phase data may be provided to the SLM 104 in order to control the orientation of crystal molecules on the liquid crystal layer 122 of the SLM 104, thereby changing the phase of the light emitted by individual pixels of the SLM 104.

As used herein, the term diffraction pattern image indicates an image displayed on an SLM or other holographic display device while the term diffraction pattern image data indicates the data, in any format, used to generate the diffraction pattern image. At a particular distance from the SLM (which may include optics between the SLM and the viewing space), the resultant wavefront generates a holographic image. As discussed, the holographic image in some contexts may be projected onto a screen during a run-time. The holographic image may be planar or it may have depth to provide a 3D hologram. As used herein, the term holographic image indicates a planar or 3D holographic image or hologram. For example, the resultant light field from the SLM may focus to an individual plane or to multiple adjacent planes during a run-time to generate 3D imagery. Furthermore, time multiplexing techniques may be used to generate the effect of 3D imagery by refreshing planar or 3D holographic images at a rate faster than what is noticeable to the human eye.

Holographic image 118 is generated based on an interference pattern provided by modulated light that is observed or detected at a particular distance from the SLM 104. In the context of phase modulation, no amplitude modulation occurs such that any amplitude variation within holographic image 118 is generated based on constructive and destructive interference as provided by the diffraction pattern image data to the SLM 104. Although illustrated with respect to a planar holographic image 118, holographic imaging arrangement 100 and the techniques discussed herein may be employed to generate 3D holographic images.

Screen 116 may be a standard diffusive screen surface reflective to all or most wavelengths of light, or screen 116 may be reflective only to a band of light corresponding to the band of light of the incident coherent light and modulated light while being translucent with respect to other bands of light and, in particular, to other bands of visible light. For example, screen 116 may be glass (e.g., a windshield of a car) that has elements that are (largely) invisible to the naked eye but reflect a narrow band of wavelengths around those of coherent light and modulated light. In some implementations, screen 116 includes optical elements that further project and/or reflect modulated light such that, for example, holographic image 118 appears to be over the hood of an automobile.

Holographic imaging arrangement 100 may be employed in any context such as automotive heads up displays (HUDs), augmented reality (AR) displays, virtual reality (VR) displays, multi-focal head mounted displays (HMDs), etc. Furthermore, diffraction pattern image data may be transmitted from SLM control 102 to SLM 104 or another component of a holographic display using any suitable technique or techniques. In some implementations, SLM control 102 is local to SLM 104 such that they are implemented in the same device. In other implementations, SLM control 102 is remote from SLM 104 and diffraction pattern image data is transmitted to SLM 104 via wired or wireless communication. In some implementations, the diffraction pattern image data may be stored in a memory accessible to SLM 104.

Figure 2:
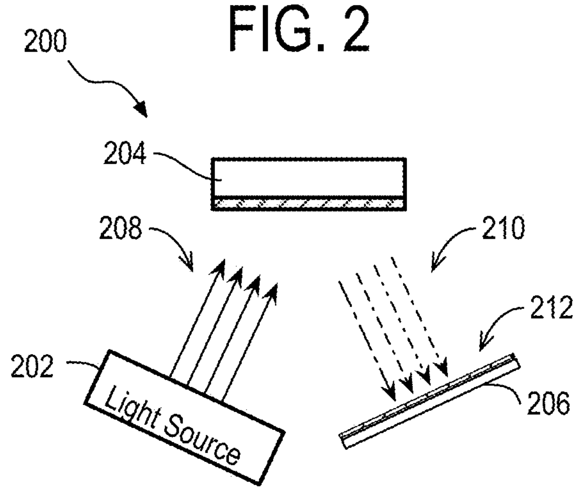
FIG. 2 is a schematic diagram of an alternative holographic imaging arrangement that may be used in a holography system such as that of FIG. 1 and according to at least one implementation disclosed herein.

Referring to FIG. 2, an alternative holographic imaging arrangement 200 (also referred to as a holographic system, device, or projector) is shown and is similar to arrangement 100 except without a beam splitter. Instead, arrangement 200 has a light source 202 emitting light 208 directly toward an SLM 204. The SLM 204 is arranged to reflect the light 210 through a phase-modifying liquid crystal layer and toward the display 206 to form a holographic image 212. Otherwise, the operation of the arrangement or system 200 is the same or similar to the system 100. The light source 202 may include a laser LED and collimation optics.

Figures 3, 4, 5:
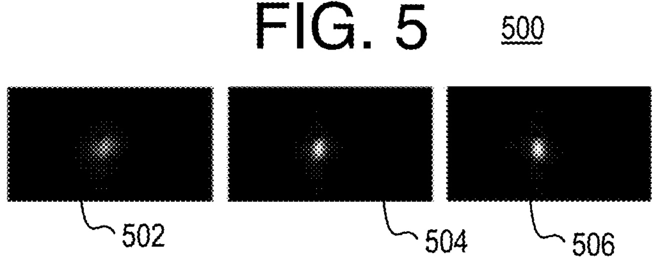
FIG. 3 is a schematic diagram of a holography phase error measurement system according to at least one implementation disclosed herein.
FIG. 4 is a set of lens profiles of diffraction pattern images used on the system of FIG. 3 according to at least one implementation disclosed herein.
FIG. 5 is a set of images captured by a sensor array of the system of FIG. 3 according to at least one implementation disclosed herein.

Referring to FIG. 3, a calibration stage setup or arrangement 300 may be provided during a calibration stage of a manufacturing process (or more precisely, post-manufacturing) of the holographic projector, and particularly once a holographic projector 100 is constructed and ready for testing or calibration typically before being used in a run-time by an end user. Thus, the calibration setup 300 here includes the holographic projector 100 as described above except now instead of a display 116, an image capturing sensor array 302 of a camera 304 may be placed in front of the SLM 104 and used to capture images from modulated light emitted from the SLM 104. The calibration stage also includes having the projector 100 communicatively connected with a phase error generation unit 306.

Specifically, the calibration stage referred to herein may occur when the SLM 104 is in a fixed position relative to the light source 108 and any intervening optical elements including the collimator 110, beam splitter 112 when used, and so forth. During this calibration stage, the holographic projector 100 may not yet be placed fixed in front of a display, such as display or screen 116, particularly when the display would block modulated light propagating from the SLM to a camera 304 placed in line with the optical axis of the light propagating from the SLM. While it is expected that the calibration will determine the phase error of each manufactured projector separately since actual hardware dimensions may be significantly different from projector to projector, a golden projector could be tested instead to provide the same phase error to all products when such a situation is found to be adequate to provide holographic images with a desired sufficient quality. The disclosed system also may be used to periodically re-calibrate already-manufactured projectors that are in use.

The sensor array 302 may include an array of 5320×3032 sensor pixels, by one example. The camera 304, however, may not have a lens so that sensor array is a bare sensor and light received by the sensor array 302 may be received directly through the air (or other transmission medium) without transmission through additional light-modifying optical elements on the camera itself after exiting the SLM and any projector optics such as the beam splitter 112 in front of the SLM when the beam splitter is used. The camera 304 may have its own processing circuitry to convert signals from the sensors on the array 302 into digital luma or brightness values (and/or chroma values when being used), and provides those digital values as raw image data to the phase error generation unit 306. By one form, the camera 304 may have high pixel density sensors. For example, the camera may have about 2.2 μm to 2.74 μm wide pixels to characterize SLMs with about 4.25 μm to 11 μm wide pixels. Laterally, the camera sensor should cover a beam directly reflected by the SLM where the holographic projector 100 may form a convolutional Fresnel setup that can be explained or represented by a convolutional Fresnel or angular spectrum (ASM) propagation model. By one form, the camera sensor array 302 and array of pixels on the SLM are centered and aligned along the same optical axis OA. The camera may be a Basler a2A5320-23 umPRO or Basler puA2500-14 um (2592×1944 2.2 μm pixels) camera.

During a run-time, the SLM control 102 provides diffraction pattern image data that forms a diffraction pattern image to be displayed on the SLM 104. The diffraction pattern image may provide a phase channel that includes per-pixel phase values (also referred to as a lens phase profile or just lens profile) such as 0 to 2 to be used to control the Fresnel lens (or liquid crystal layer) of the SLM 104. The diffraction pattern image data also may include another channel of per-pixel image data (or amplitudes), and for this example may be luma values or grey-scale values of 0 to 255 to generate the model images phase error compensation calibration stage by one example.

Such a computation may be eliminated, however, and SLM parameters may be used directly to generate ideal (or near ideal) test phase patterns 400 to be used to generate the model image data. Referring to FIG. 4 for example, a set 400 of the diffraction pattern images (or lens profiles or test phase patterns) 402, 404, and 406 are shown where each of the images in the set 400 (also each referred to as test phase patterns 400) is a computed phase profile of a lens with a different focal length ($z_0$, $z_1$, or $z_2$) so they focus a beam of light of measured wavelength respectively at different focal planes ($f_0$, $f_1$, or $f_2$) to generate three different holographic images (or holograms) for a single target image. Such computation is performed by the phase error generation unit 306 itself. Little or no visual correspondence may exist between the diffraction pattern images 402, 404, and 406 that are just phase maps shown in the illustrations converted into grayscale images depending on the phase values and depicting typical Fresnel lens patterns, and the target holographic image. Thus, while rings are visible here on the phase-based images 402, 404, and 406 due to conversion of a typical dome-shaped lens phase profile to a Fresnel lens profile, interference actually results in a flat black background as shown and discussed below with FIG. 5.

The sensor array 302 may be placed at a distance z in front of the SLM 104 in a light propagation path 308, and specifically from the sensor array 302 to the liquid crystal layer of the SLM 104 (shown in FIG. 1). By one form, the distance $z_1$ to a focal plane $f_1$ may be 0.5 to 1.0 meters, and a distance d between focal planes $f_1$ and $f_0$ and/or $f_1$ and $f_2$ may be 0.01 meters. Referring to FIG. 5, a set 500 of resulting captured images 502, 504, and 506 may be captured at the sensor array 302 due to the propagated light from the SLM 104. As shown, each image 502, 504, and 506 has a specific intensity distribution in and around the image center looking like a spot with a malformed shape. This intensity distribution is different from ideal, clear, and sharp theoretical images (see images 704 on FIG. 7 for example) because of phase errors. In the absence of phase errors, intensity distributions on images 502, 504, 506 would have very characteristic oval blob-like shapes. These captured images 502, 504, and 506 may be used as the actual intensity images for comparison to the model images discussed below. The Fresnel lens profiles are used for measurements because in the absence of phase errors, the Fresnel lens profiles produce very characteristic intensity distributions at and around the lens focal length. In addition, a simple analytical formula for the lens phase profile exists making it easy to create a diffraction image (phase maps) for a lens. The distance $z_1$ is relatively long (at about 0.5 meters or more) because a distance significantly shorter than this could result in spots that are too small to be differentiated from image to image when using high brightness or amplitude values at the spot. It should be noted that while three focal planes are being shown, there may be more than three when desired, as long as the multiple focal planes can be used to resolve beam position ambiguities. An astigmatic lens with different horizontal and vertical focal lengths could be used as well.

Figure 6A:
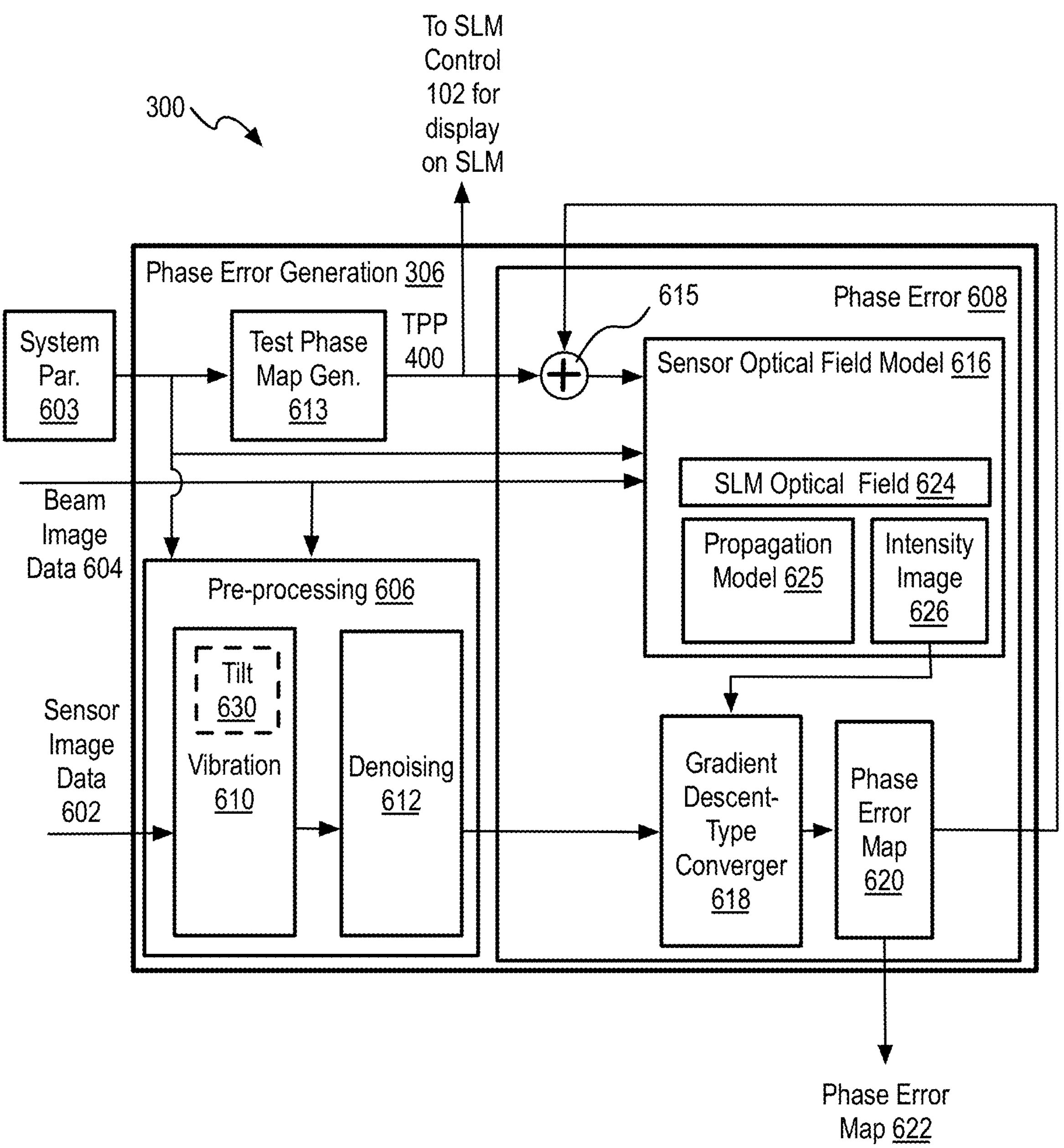
FIG. 6A is a schematic diagram of a phase correction unit of the system of FIG. 3 according to at least one implementation disclosed herein.

Referring now to FIG. 6A, phase error generation unit 306 may be used to determine phase errors according to at least one of the implementations disclosed herein. The phase error generation unit 306 may be formed of hardware, software, firmware, or any combination thereof, and may or may not be located locally on the same circuit board(s) or packages as the holographic projector 100, and specifically the same circuitry as the SLM control 102. Whether or not on the same circuitry as the holographic projector 100, the phase error generation unit 306 may be within the same electronic device as the projector 100, such as within the same body or container, and may be a permanent part of such a device or projector 100. Alternatively, phase error generation unit 306 may be remotely coupled to the projector 100 to be at least communicatively coupled to the SLM control 102. This may be by wired or wireless connection, whether short or wide range, and may be structured with many different formats, protocols, and so forth. The remote connection may be temporary and to be connected, by one form, only during a calibration stage described below.

The phase error generation unit 306 may have a pre-processing unit 606, a test phase map generation unit 613, an adder 615, and a phase error unit 608. The pre-processing unit 606 may have a vibration unit (or vibration compensation unit) 610 and a denoising unit 612. The vibration unit 610 may have an optional tilt (or tilt alignment) unit 630. The phase error unit 608 may have a phase profile unit 614, a sensor optical field model unit 616, a gradient descent-type converger (or just GD) unit 618, and a phase error map unit 620. The sensor optical field model unit 616 may have a SLM optical field unit 624, a propagation model unit 625, and an intensity image unit 626.

In more detail, the phase error generation unit 306 has a model image pipeline and a captured image pipeline. In the model image pipeline, test target images are not required. Instead, phase profiles (test phase patterns) 400 for the wavelength being calibrated are directly calculated and used for image capture process and to form model images for the gradient descent process. The test phase patterns 400 are ideal (or near ideal) phase patterns without phase errors. The test phase patterns (TPPs) 400 are generated by the test phase map generator 613 and provided to the phase error unit 608. By one example, system parameters 603 may be used to generate the TPP 400 and may include SLM pixel resolution (W, H), wavelength λ, SLM coordinates:

$$x_1^{ij} = ((-W/2 + i)\Delta p, ((-H/2 + j)\Delta p)$$

where i=0 to W−1, j=0 to H−1, and where Δp is a SLM pixel pitch. The system parameters 603 also may include distance between SLM and camera sensor (z1) and test pattern distances or focal lengths (z0, z1, z2, . . . ) as described above. Otherwise, beam image data 604 may be provided and may be in the form of wavelength-specific beam intensity profile $\beta_\lambda$ or just B, which is a 2D array of beam amplitudes also with a size of W×H. The beam intensity profile B 604 may be measured by known methods, or may be approximated as uniform at the cost of reducing phase error estimation precision. Thus, no requirement exists in this case to use the actual amplitudes based on an input target image. By this example then, no need exists for input target images for this calibration at all. The system parameters 603 and beam image data 604 may be provided to the phase error generator 306 to distribute to the appropriate units: 613, 616, and 606.

The test phase pattern 400 may be in the form of a 2D array of the $x_1$ coordinates of size W×H×2 and designated $L_\lambda=(L_\lambda z_0, L_\lambda z_1, L_\lambda z_2, \ldots)$, which is a collection of the 2D W×H arrays, where there may be three or more arrays. The TPP 400 is provided to the SLM control 102 to display a resulting diffraction pattern image on the SLM 104, explained below.

Additionally, the TPP 400 (or phase profile L) may be provided to an adder 615 to add the latest phase error guess (current phase error value $P_{err}$) and then provided to the SLM phase error unit 608. Specifically, the SLM optical field unit 624 of the sensor optical field model unit 616 receives the phase profile L (one of the TPP 400) already summed with the current phase error value $P_{err}$, and beam amplitude profile B 604. The SLM optical field unit 624 may use both the amplitude and phase profile data 604 and the sum of L and $P_{err}$ to form an SLM optical field $u_1$. A current phase error $P_{err}$ variable may start as an initial guess and thereafter may be generated by the gradient descent-type operation described below. The sensor optical field model unit 616 then may be considered to input the SLM optical field into a convolutional Fresnel propagation model (or phase error propagation model) with the phase error variable and operated by the propagation model unit 625 that may be at least partly based on complex number diffraction algorithms where the real component of the complex number is amplitude and the imaginary component of the complex number is the phase of the images. The model then may be used to compute pixel data for a sensor optical field (or model image) $u_2$. The resulting sensor optical field can then be converted into an intensity model image by the intensity image unit 626. This intensity model image represents the non-ideal model sensor image data for the multiple focal planes with a modeled, unknown phase error, and is provided to the GD unit 618 to compare the model images to the captured images with actual phase error.

Separately at the captured image pipeline, the phase error generation unit 306 receives sensor image data or captured sensor images 602 that may be the raw image data generated by the camera 304. If the camera has not already performed pre-processing sufficient to provide each pixel with a luma (or other image data value), then the pre-processing unit 606 may perform such computations as well. Otherwise, the vibration unit 610 then may re-align image content from multiple captured images to compensate for vibration as described below, and from multiple images to an anchor image at the same focal plane. This may be repeated for each focal plane being used. Denoising then may be applied to the realigned images by using time averaging and subtracting background noise estimation collected on dark zones of the images also as described below.

The pre-processed captured images then may be provided to the phase error unit 608 in order to compute the phase errors. Particularly, the captured images may be in the form of intensity images (with amplitude values for each pixel) and provided to the GD unit 618 for comparison to the non-ideal model images (with the current guess of phase errors).

The GD unit 618 performs a gradient descent type of operation to generate phase errors. To perform the gradient descent, the output of a loss function is minimized and that performs a comparison of the sensor intensity model image (based on the diffraction pattern image L with current phase error value $P_{err}$ added to it) representing the non-ideal model image with unknown phase error and the captured image representing the actual image based on the same test pattern L with actual phase error. By one form, once current phase error is generated, the gradient of a target loss function with respect to the phase error variable is computed and used to calculate a new value for the phase error. The target loss function can be some combination of the image loss functions from the multiple focal planes where image loss function provide a measure of difference between model and actual intensity images By one example, the mean square error over all pixels in all focal planes is the loss function that is minimized by the algorithm. In that case, the loss function is the mean of mean square errors over output at each focal plane, new gradient is the mean of gradients of mean square errors at each plane, and new phase error is a weighted sum of the new gradient and the previous phase error that was used, thereby outputting a new phase error value for each focal plane. This may be repeated until a criterium of acceptable minima is met. Thus, the new phase error is computed for all elements in 2D maps, $P_{err}$ is a 2D array, and the gradient may be represented as a 2D array for convenience.

Once found, a phase error map unit 620 then places the final phase errors into a phase error map that can be applied to any target image going forward. Each phase error for an individual pixel may be a value of 0 to 2π that is a variation (or more precisely a deviation) from the desired ideal target (or diffraction pattern) value. The phase error map may be any convenient or efficient listing or array of the phase error values, and may be a modified version of the phase error values (such as within a scale of 0 to 1).

Figure 6B:
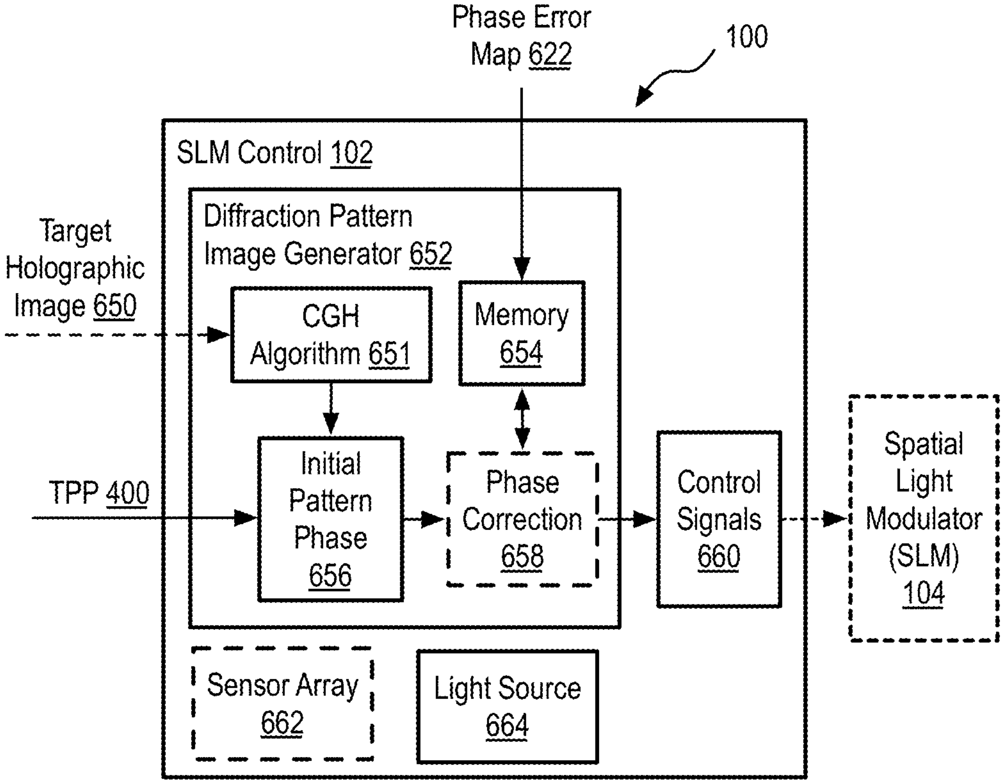
FIG. 6B is a schematic diagram of an SLM control of the system of FIG. 3 according to at least one implementation disclosed herein.

Referring to FIG. 6B, the SLM control 102 may have a diffraction image pattern generator 652 that generates the diffraction pattern images upon receiving a target holographic image (or data therefore) 650 during a run-time. The diffraction image pattern generator 652 also may generate diffraction pattern image data by using the TPP 400 instead of CGH algorithms. The SLM control 102 also may have a control signal unit 660 that converts the diffraction image data into signals to control the SLM 104, a sensor array unit 662 to control the capture of images at camera 304 during the calibration stage, and a light source unit 664. The sensor array unit 662, as with the phase error generation unit 306, may only be needed during the calibration stage such that the sensor array unit 662 also may be removed or disconnected if the sensor array unit 662 is located remote from the SLM control 102 and after the phase error has been computed and loaded to the SLM control 102 (or somewhere accessible to SLM control 102) when the device is ready for run-time. The operation of the light source unit 664, sensor array unit 662, and the control signals 660 may be coordinated in order to capture images at the sensor array after each time the control signals have setup the SLM for a next image. Thus, a camera capture signal transmitted to the camera 304 by the sensor array unit 662 may be synchronized with a laser "on" signal from the light source unit 664 according to a clock or SLM control schedule.

During a run-time, the target image 650 may have any desired content to form a holographic image and may include any suitable picture, video frame, or the like, or any data structure representing a picture or video frame at any suitable resolution. In an implementation, target holographic image data 650 may be single channel image data having a single value (e.g., luma) for pixels thereof such that each value indicates a desired amplitude or brightness for the pixel in a displayed hologram. Target holographic image data 650 may correspond to any desired holographic image or hologram to be presented to a user.

The target holographic image (or just target image) 650 may be received by the diffraction pattern image generator (or pattern generator) 652. By one form for a run-time stage, the pattern generator 652 may have a CGH algorithm unit 651 that may perform an internal two-channel conversion to convert the target holographic image 650 into amplitude and phase values that may be represented using any suitable technique or techniques, when such two-channels are desired. The output diffraction pattern image (or phase pattern) is typically obtained from calculations performed by known CGH algorithms such as a Gerchberg-Saxton algorithm, or other gradient descent-based algorithms. Otherwise, the CGH algorithms for run-time may include any formula or algorithm that models propagation of light from an SLM to a zone of interest (e.g., a projection plane, a viewing zone, etc.). For example, a propagation model may approximate a diffraction integral for a given holographic setup. Any propagation model may be applied such as a Fraunhofer propagation, Fresnel propagation (which multiplies the SLM optical field by quadratic phase profile similar to the phase error propagation), and so forth. For example, the constrained optimization problem may model forward propagation of light for the display setup. The constrained optimization problem may be solved using iterative approaches which iteratively applies a forward and inverse propagation model in multiple passes across an entire image including application of a non-linear function, inverse fast Fourier transform (IFFT), non-linear function, fast Fourier transform (FFT), etc. In an implementation, the iterative process is a Gerchberg-Saxton algorithm that successively applies forward and inverse propagation model applying necessary constraints in between. In an implementation, the iterative process or algorithm is a Fienup (phase adaptation) algorithm. In an implementation, the iterative process or algorithm is a FIDOC (Fienup with a do not care region) algorithm. Both the choice of the propagation model employed and the characteristics of the model itself are based on the particular arrangement of holographic imaging arrangement 100. Characteristics of the particular arrangement of holographic imaging arrangement 100 pertinent to the propagation model choice and the parameters thereof include the optical setup, the distance of the hologram from the holographic display, and other factors.

The output of the diffraction pattern image is an initial pattern phase or phase profile formatted into SLM pixels, for example, by initial pattern phase unit 656. When no phase error map is provided, this phase profile can be used directly to display the diffraction pattern image on the SLM 104.

During the calibration stage, the phase profiles of TPPs 400 are directly computed and converted into pixel values for SLM 104 by the initial pattern phase unit 656. The converted TPP 400 may be lit by a beam of known (or previously measured amplitude profile), and forms the interference picture at the camera sensor 302 that captures images 602. The captured images 602 are sent to the phase error generation unit 306 as described above.

To display the now diffraction pattern images 400 on the SLM 104, the control signal unit 660 then may convert phase values into signals to control the liquid crystal layer on the SLM 104 to display a hologram using, for example, global phase response curves, as part of the process. The control signal unit 660 may be on or considered to be part of the SLM 104 rather than the SLM control 102. The SLM 104 then projects the diffraction pattern image data, which can then be captured by the sensor array 302 as described above.

Also at SLM control 102, the phase error map 622 may be placed in a memory 654 on or accessible to the SLM control 102. Thus, during a run-time, once the initial pattern phase values are generated, a phase correction unit 658 may obtain phase error values from the phase error map 622 at memory 654. The phase correction unit 658 modifies the initial phases according to the phase error map, which may be performed pixel by pixel of corresponding pixel locations on the map and the initial diffraction pattern image. The phase error may be added (or subtracted) from the initial phase, and then the corrected phase profile of the diffraction pattern image data may be provided to the control signal unit 660 for display of the diffraction pattern image on the SLM.

The memory 654 may be any type of convenient or efficient memory for such purpose and may be non-volatile memory such as a hard disk drive or flash memory, but could be more than one memory with a more local volatile memory such as DRAM or cache on-board or on-chip that obtains the phase error map from a less local non-volatile memory.

Figure 7:
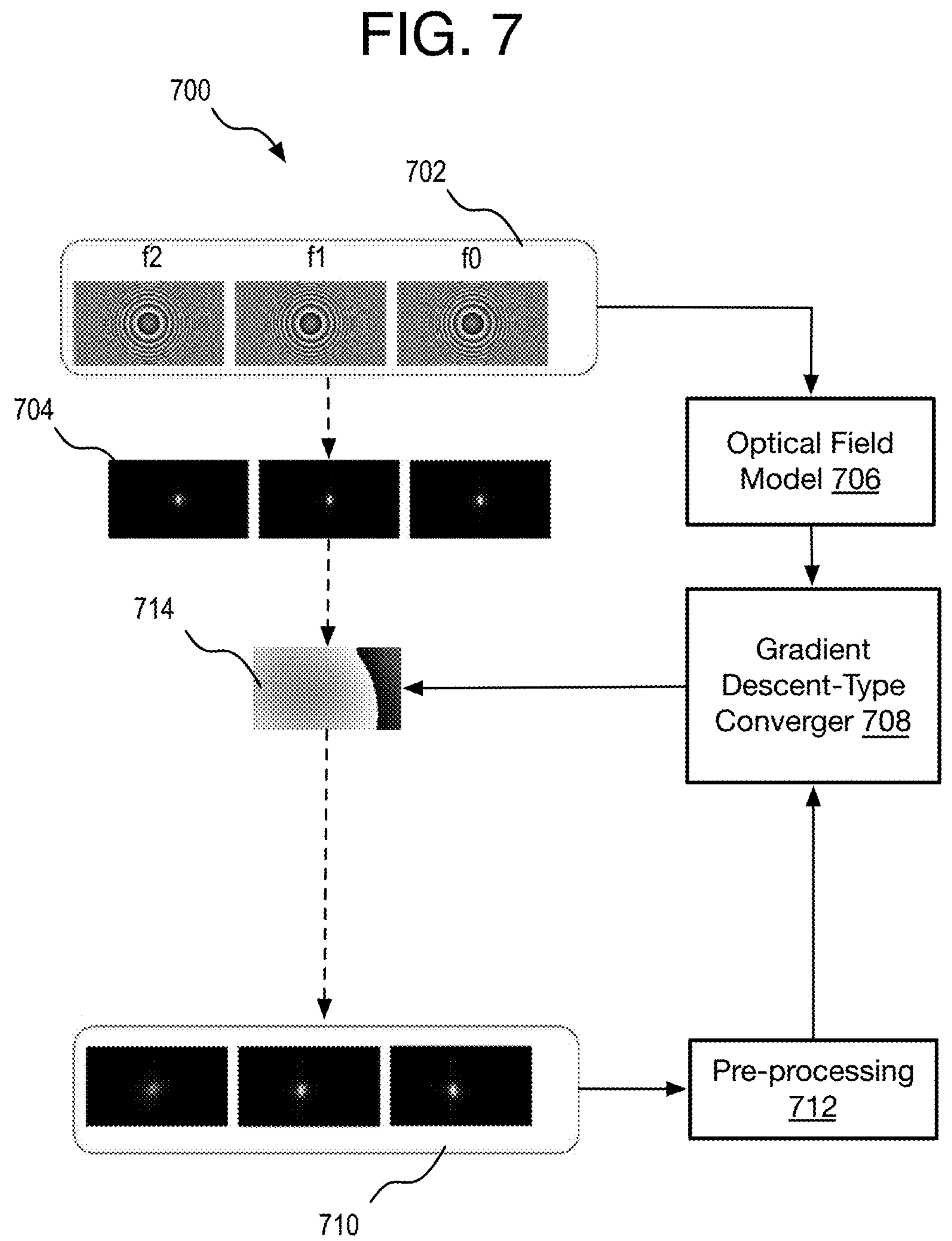
FIG. 7 is a schematic flow diagram of a phase correction system according to at least one implementation disclosed herein.

Referring to FIG. 7, a holographic system 700 is provided to depict performance of the gradient descent-type operations during the calibration stage. Particularly, a set 702 of at least three diffraction (or Fresnel lens) pattern images (or focal planes) f0, f1, and f2 respectively have three different focal lengths z0, z1, and z2. The target image content was a spot in the center of a dark background. The pattern images f0, f1, and f2 are displayed on the SLM and ideally should form clear and sharp ideal target images as shown by image set 704. Instead, a camera captures images resulting in unknown phase errors (as represented by phase error image 714) and in a set of actual captured images 710. The captured images in set 710 have a much blurrier spot than the ideal images in the ideal image set 704. The captured images may be pre-processed by pre-processing unit 712 and as described herein, and then provided to a gradient descent-type converger unit 708.

Meanwhile, the diffraction pattern images 702 may be provided to an optical field model unit 706, as with the phase error generation unit 306 described above, that generates non-ideal model images with an unknown variable phase error for the sensor array or camera. This is accomplished by using the diffraction pattern images 702 to form an SLM optical field. The SLM optical field is then input in a convolutional Fresnel propagation model that generates a sensor optical field for each or individual input image. A version of the sensor optical field, such as in the form of a model intensity image, may be input to the gradient descent-type converger unit 708 as the intensity model image. The multiple or all corresponding pairs of model and captured intensity images may be input to a loss function to be minimized by the gradient descent-type operation, and may result in phase error values of phase error image 714. The average phase errors over the multiple focal lengths are used to populate a phase error map that can be used during run-time.

Referring to FIG. 8 for more detail, a method 800 of generating holographic images with phase error compensation is arranged in accordance with at least one of the implementations of the present disclosure. Process 800 may particularly include one or more operations 802-832 generally numbered evenly to determine phase errors during a calibration stage. By way of non-limiting example, process 800 may form at least part of a holographic imaging process performed by systems 100 and 300 of FIGS. 1 and 3 as discussed herein. Furthermore, process 800 may be described herein with reference to systems 100 and 300.

Process 800 may include "determine diffraction pattern image of multiple focal lengths to be displayed at an SLM" 802. As described above, the test phase patterns may be used to form a diffraction pattern image to be displayed on the SLM. The test phase patterns can be computed from system parameters and analytical formulas for a lens profile of a given focal length, and may be generated by the test phase map generation unit 613. As mentioned, these test phase patterns represent the ideal phase profiles with no phase error.

Process 800 may include "display diffraction pattern image at SLM" 804. Here, the diffraction pattern image data may be transmitted to the SLM. The SLM then adjusts or modulates each pixel on the SLM according to the phase in the diffraction pattern, such as from 0 to 2π. The phase of the diffraction pattern may encode a focal length. The effect may be achieved by displaying a quadratic lens profile $L_{z_i,\lambda}(x_1)$ forming a diffraction pattern of a Fresnel lens focused at a certain distance $z_i$. Specifically, as described with FIG. 3 above, each distance $z_i$ (i=0 to 2 in this example) is a distance from the SLM liquid crystal pixel array to a focal plane $f_i$, where i is a focal plane position, the camera sensor array is set at $z_1$ in this example, and $z_{0,2}=z_1\pm d$ (where d is a small offset from the focal plane $f_1$, which may be about 0.01 meter). Many different arrangements of the number and position of the focal lengths could be used instead, such as $z_{0,1,2}=z_c+d_{0,1,2}$ where $z_c$ is the distance between camera sensor and SLM and $d_{0,1,2}$ are sufficiently small distances to preserve enough energy in the resulting spot intensity images. The projector with the SLM is then operated as described above with projector 100 to propagate light to the sensor array of a camera (or image plane).

Process 800 may include "capture multiple images at a sensor array receiving light propagated from the SLM at the multiple focal lengths" 806. Thus, images are captured that represent the same target image for the multiple focal planes and distances. As mentioned, the captured images also may be generated by a single diffraction pattern image depending on whether the SLM merely changes the focal length of the same diffraction pattern image or not. By one example form, the camera captures 1 to 100 images, and alternatively 20-100 or 30-100 images, for each focal length, and so the multiple images can be used for time averaging denoising described below. The captured images may be designed as $I_{ij}$, where j=0 to 99 images of a beam cross-section, and I is an iteration of one of the focal planes i of a certain image j. Also as mentioned, the capture of the images may be synchronized with the light source or laser "on" signal typically provided by an SLM control schematic.

Process 800 may include "perform pre-processing on the captured images" 808. This optionally may include "obtain target holographic image" 810, which refers to generating ideal images with no phase error. The images may be single spot intensity images produced by forming an optical field from the test phase patterns and correspondent measured beam amplitude profiles, and then applying a propagation model as described for generating model images for phase error measurement as described in detail below (see equation (1) below), as one example.

Process 800 optionally may include "measure sensor-SLM tilt misalignment" 812. Particularly, during the calibration stage, if a camera sensor center and SLM center are laterally mis-aligned where the optical axis OA of the two are not colinear (either by lateral translation shift or non-parallel due to rotation), this results in an extra tilt displacement that can contribute to the phase errors. This may cause a slight undesired shift of image content in the holographic image on the sensor array (or display during run-time). By one form, the tilt component can be removed by a marker-based pre-processing or post-processing operation (after capturing images). In this case, lateral SLM-camera misalignment can be detected by using physical markers on the SLM and the camera. The detection may be performed by using an alignment tool or camera that captures an image of the camera placed in front of the SLM to see if the markers on the two align and the distance and direction of the misalignment. The position of the camera and/or SLM relative to the other then may be adjusted until alignment is reached to reduce the amount of tile misalignment before capturing images with the sensor array. When the process is after the capturing of the images, the amount of the shift can be deducted alone or within the vibration compensation operation as explained below.

By yet another alternative, the tilt mis-alignment measurement 812 as well as the generation of the representative target holographic image may be performed at an end of vibration compensation and time-averaging operations for pre-processing, where operation 812 uses the time-averaged result for global shift detection and correction instead of the anchor image for a given focal length.

Thus, the pre-processing also may include "perform vibration shift removal" 814. This includes aligning the image content of multiple images of the same focal plane (or distance $z_i$) to the image content on a single anchor image to reduce or eliminate image content shifts caused by vibration or movement of the projector components. The anchor image can be any selected image such as a first or last captured image of the same focal plane. Otherwise, the anchor image could be an average image of all multiple images of the same focal length. For example, for each focal plane (or beam spot) i=0 to 2, the following operations may be performed.

Vibration compensation operation 814 may include detecting an image content shift between the image content on an anchor image $I_{i0}$, in this example, and all other images (or other selection or sampling of the images) in a time sequence of captured images for the same focal plane i (shift($I_{i0}$, $I_{ij}$), j=1 to 99 in this example). The shift in image content can be detected using a correlational method since each of the images should have an identical spot except shifted (in x and/or y directions forming the plane of the image) due to the vibrations. The shift may include a pixel distance (whether full pixel distance or fractional pixel distance) and direction (which may be a slope defined by the pixel distances for example. One example correlation technique that can be used may be performing a typical 2D cross correlation operation between the anchor image and another actual image, finding coordinates with maximum value in a correlation map and computing actual shift from the found coordinates and the layout of the cross correlation map. Phase correlation may be used to speed up the cross correlation using 2D FFTs.

Thereafter, the operation 814 may include computing a mean vibration shift $M_i$=mean(shift($I_{i0}$, $I_{ij}$)) resulting in an estimate of the actual spot location with regard to anchor image $I_{i0}$. This is repeated for each focal plane to generate mean vibration shift $M_i$ for each focal plane. By one alternative approach, when global tilt or shift is not known in advance, an anchor image location, Mi=(0, 0) or other suitable small shift value can be used, if all shifts shift($I_{i0}$, $I_{ij}$) are small enough to avoid loss of information caused by excessive image shifts.

Once the representative or mean vibration shift $M_i$ is determined, the image content of each of the images $I_{ij}$ are shifted by a distance and direction by $M_i$. This should align image content of all (or selected) images of the same focal length to an image content position of the anchor image $I_0$ thereby reducing or eliminating the vibration component of the phase error.

Vibration compensation operation 814 also may include compensating for the global tilt or shift mis-alignment between the camera sensor and SLM. When tilt or shift is not known in advance, optional step 802 may use a correlational technique to align the anchor image of vibration compensation to the target ideal spot image generated by the test phase pattern at step 804. Alternatively, the final vibration-compensated time averaged result can be aligned to the ideal spot image from step 804. By yet another approach, the global shift or tilt may be given or estimated in advance by, for example, using a Fresnel zones method when an operation similar to that used for vibration may be used here for global tilt or shift mis-alignment as well. Thus, the phase image may be divided into multiple zones, such as 1 to 16 smaller area Fresnel zones at known locations on the phase image that each may produce multiple spots that may be aligned in each Fresnel zone and from all or multiple individual images. The phase image may be aligned to an anchor image of the same multiple images of a single focal length used for the vibration compensation. In this case, the anchor image for the global tilt or shift compensation should be the ideal image generated from Fresnel phase image by the operation similar to the operation 810. The Fresnel zones may be divided zones across the entire image. Also, the spots may be correlated or registered to the anchor image using the same correlation technique used for the vibration compensation. The tilt shift distance and direction can be added to the vibration shift to determine one single cumulative shift direction and distance.

Once vibration compensation is complete, process 800 may include "perform denoising" 816, and in order to remove noise created by increasing the amplitude of the spots on the images as explained above or other reasons. The denoising may be performed by time averaging the images at the same focal length. Particularly, each or individual images in a time sequence for the same focal length (such as 30 to 100 images) has a noisy image of a beam cross-section spot (see FIG. 13 below for example). For each focal plane i=0 to 2, the denoising may be performed by the following operations Denoising operation 816 may include computing a time average image $I_{ia}$=mean($I_{ij}$), j=0 to 99 and for each focus plane. This includes averaging the luma pixel value (0 to 255 for example) at each pixel location and across all (or selected) images produced by the test phase pattern of the same focal distance.

Denoising operation 816 then may include estimating the noise at different zones on the images. By one form, this includes defining four corner zones of the average image $I_{ia}$. The corners are selected to be zones since the corners should be the darkest in the image being the farthest from the bright spot. Those darkest zones are not expected to have any energy from a focus spot so they carry information about the background noise. The zones may be rectangular and can be 400×400 pixels for example when the full image is 2000×2000 pixels. Otherwise, the zones may be any desired or efficient shape, and may be zones outside of the focus spot on the image, or any location on the image where energy from the SLM is not expected to appear as a result of focusing process, including zones selected automatically or determined by a human operator of the system.

The background noise may be estimated as a mean difference in expected amplitude from the diffraction pattern image which is expected to be zero and the actual amplitudes in the corner zones. This provides the simplest background noise estimations. It will be understood, however, that other de-noising algorithms could be used as well such as a Weiner filter.

Thereafter, the estimated pixel level noise values may be averaged, and then the computed mean noise may be subtracted from all or selected pixels on the average image $I_{ia}$. The average background noise is subtracted from all pixel locations, or other filter is applied such as a Weiner filter.

As an additional option, the average image $I_{ia}$ may be filtered with a small kernel median filter when an insufficient number of time samples exists for a single focal plane such that purely averaging the noise estimate is not reliable. This may occur when there are less than 10 samples being used. The median filter size is typically 3 to 7 pixels.

The denoised time average image $I_{ia}$ then may be resampled to the SLM pixel pitch (where pitch is a center to center distance between adjacent pixels) since the sensor array may have a different pitch than the SLM. When the resulting pre-processed captured image has a resolution larger than the resolution of the SLM pixel array, the pre-processed image may be cropped down to the size of the pixel array of the SLM. The result is a single pre-processed captured image $I_i$=$I_{ia}$ for each focal plane i that is being used and that is of high quality image data suitable for accurate phase error retrieval.

Process 800 next may include "obtain diffraction pattern image data" 818. This involves obtaining the phase profile that was used to display the diffraction pattern image at the SLM in the first place. The phase profile may include values of 0 to 2π for each pixel location $x_1$, by one example. By one form, a different diffraction pattern image exists for each focal length.

Thereafter, the operations below may be repeated for every different wavelength that may be used in the target images, which is typically three different wavelengths for color and grey scale images such as for RGB color schemes since laser LEDs (or SLEDs) have narrow bands, and multiple lasers may be used to achieve color.

Process 800 may include "compute phase error" 820. The phase error may be computed by determining the deviation included in a non-ideal model image based on the target image, but formed from the diffraction pattern image data plus a phase error or phase error variable to represent the deviation. The deviation also is present in the actual or captured image from the camera's sensor array but cannot be easily isolated from the total phase of the light in the captured image. The gradient descent on a loss function comparing the model images and captured images can accomplish this detection of the phase error.

Thus, process 800 may include "generate model sensor optical field at sensor array" 822, which is the theoretical optical field including the phase error variable to be determined. To accomplish this, first the theoretical or model image as if captured at the sensor array and assuming a phase error component may be generated by using the diffraction pattern image data. Thus, the model image can be generated by first solving an analytical model of optical field propagation (or convolutional Fresnel diffraction model). In this computation, an SLM optical field $u_1$ at the SLM plane can be used to compute a sensor or model optical field $u_2$ at the sensor plane located at a focal length or distance z from the SLM plane, and where sensor optical field $u_2$ is described by the following mathematical propagation model:

$$u_2(x_2) = \frac{\exp(ikz)}{i\lambda z} \int u_1(x_1) \exp\left(\frac{i\pi}{\lambda z}(x_2 - x_1)^2\right) dx_1 \quad (1)$$

where $x_1$ are 2D coordinates on the SLM plane, $x_2$ are 2D coordinates on a sensor plane, $\lambda$ is the wavelength, i is an imaginary unit, and k is a wavenumber or wave spatial frequency ($2\pi/\lambda$). The coordinates x1 and x2 may be 2D arrays of the coordinates (W×H×2 for x and y coordinates) When $x_2$ and $x_1$ have the same pitch, the integral in equation (1) can be computed as a convolution between u1( ) and the exponent term exp( ), and by one example, computed by using 2D fast Fourier transform (2DFFT) to efficiently perform the computations. The first term before the integral is a diffraction factor and turns into amplitude scaling when amplitude is computed.

The SLM optical field $u_1$ at the SLM plane may be described as:

$$u_1(x_1) = B_\lambda(x_1)\exp\{i(P_{err,\lambda}(x_1) + L_{z_f,\lambda}(x_1))\} \quad (2)$$

where B is an illumination amplitude profile for the wavelength $\lambda$ (which can be measured or constant), and i here in equation (2) refers to an imaginary unit, and f refers to the focal plane. Amplitude B representing the diffraction pattern image data may be constant or the actual "beam" profile or channel from the diffraction pattern image data. This is consistent with the two-channel format where the propagation equations (1) and (2) use a complex exponent of phase as one part to be encoded, and the other part to be encoded is the real component of amplitude. When amplitude is set to be constant rather than using the actual amplitude channel of the diffraction pattern image data, the amplitude value may be 1.0.

Also, $P_{err,\lambda}(x_1)$ is an unknown phase error being estimated. Thus, it will be understood that the model sensor optical field $u_2$ being generated is not an ideal sensor optical field, but one that assumes the inclusion of effect of non-zero phase error. The phase error $P_{err}$ (referred to as just P below) is the variable to be adjusted, which adjusts the $u_2$ sensor optical field and in turn model intensity images to be used during gradient descent explained below.

The phase profile $L_{z_f,\lambda}(x_1)$ in SLM optical field $u_1$ is a quadratic phase profile from the diffraction pattern image data focusing the beam of the wavelength $\lambda$ at distance $z_f$, and:

$$L_{z_f,\lambda}(x_l) = \frac{\pi}{\lambda z}(x_l)^2 \quad (3)$$

where the profile includes phase values at coordinates $x_1$ provided as a 2D array of real numbers as mentioned above. When these values are wrapped around $2\pi$, such an arrangement corresponds to the phase profile of the Fresnel lens. It should be noted that wavelength $\lambda$ is omitted from the formulas because the process is similar for each wavelength as mentioned above.

Then, the SLM optical field $u_1$ of equation (2) along with the phase profile from equation (3) can be substituted into the propagation model equation (1). Equation (1) then is only solved for the phase error part while generating model sensor optical fields $u_2(x_2, z_f, P_{err})$ that include a phase error component. In other words, by displaying lens profile $L_{z_f}(x_1)$ on the SLM, this creates the presence of an unknown additive phase error $P_{err}$ that cannot be isolated easily. To resolve this, and as mentioned, the phase error $P_{err}$ in the SLM optical field of the propagation model equation (1) may be tested, at first by an initial guess of phase error $P_{err}$, but then computed by the gradient-descent-type operations described below for each subsequent gradient iteration thereafter. With each phase error $P_{err}$ test value inserted into equation 1, the result is the model sensor optical field $u_2$ that may be formed of a 2D array of optical field coefficients that can be converted into image data values. By one form, optical field (or propagation function output) $u_2$ may be a 2D array W×H of complex numbers.

Thus, process 800 next may include "generate intensity model image of sensor optical field" 824, where the model intensity image of the sensor optical field that should be observed by the camera can be modeled as:

$$I(x_2, z_f, P_{err}) = \text{abs}(u_2(x_2, z_f, P_{err}))^2 \quad (4)$$

such that taking square of $u_2(x_2, z_f, P_{err})$ provides the model image (hologram) that should have been observed while factoring a specific phase error $P_{err}$ test value from a previous gradient iteration.

Next, process 800 may include "determine average phase error of the multiple focal lengths using gradient descent of a loss function that considers both the model images and the captured images" 826. The optimization problem to find the unknown phase error then can be a mean squared error (MSE) minimization problem where phase error $P_{err}$ is determined by:

$$P_{err} = \min_P\big(MSE(I(x_2, z_0, P), I_0S_0) + MSE(I(x_2, z_1, P), I_1S_1) + MSE(I(x_2, z_2, P), I_2S_2)/3 \quad (5)$$

where $z_0$, $z_1$, $z_2$ are the lens focusing distances as described above, $I_0$, $I_1$, $I_2$ are corresponding beam cross-section images, or in other words, the captured images. The captured images may be pre-processed as described above. As shown in equation (5) then, the loss function to be minimized is a mean square error (MSE) function that considers both the intensity pixel values of the captured images and the intensity pixel values of the model images from the model sensor optical fields. By one form, the loss function compares the captured images to the model images, and compared one to one for each focal length. The direction opposite to the gradient of the loss function with respect to P (which is a variable phase error value), computed at a particular candidate $P_{err}$, shows the direction from $P_{err}$ towards minimum and, as discussed below, may be used to adjust the per-pixel phase error $P_{err}$ values that are to be input into the propagation model (equations (1) and (2) in this example), which adjusts the sensor optical field $u_2$, and in turn the intensity values of the non-ideal model image $I(x_2, z_i, P)$ that includes the phase error P. This is repeated until the loss function minimum (or the phase error $P_{err}$) reaches a criterium discussed below.

Also, this operation 826 may include "modify one of the images with an energy scaling factor" 828. In other words, the equation (5) includes normalized energy to match illumination energy, and in order to scale the data of the captured images. The energy may be determined by:

$$S_i = \sqrt{\sum_{x_1} B_\lambda^2(x_1) / \sum_{x_2} I_i(x_2)} \tag{6}$$

The illumination energy scaling is used to better ensure that energy is correctly preserved in the propagation computation because the beam amplitude profile B used in equation (6) may be expressed in the units different from units in images captured by the camera. As a result, when the scaling factor is used, the loss function will converge to 0 when the exact phase error $P_{err}$ is found.

The operation 826 then may include "determine phase error map by iterating phase error values" 830. Many different gradient descent techniques may be applied to equation (5) to solve for the phase error. By one example form, a function gradient (including a vector of partial derivatives) computed at some point along the loss function shows the direction of a maximum function value growth (i.e., toward a function maximum). The opposite direction being the gradient descent points toward a function minimum. Thus, by one example optimization operation for solving for phase error $P_{err}$, the gradient descent may be performed by:

Let the function from equation (5) be set as:

$$F(P)=(MSE(I(x_2,z_0,P),I_0S_0)+(MSE(I(x_2,z_1,P),I_1S_1)+(MSE(I(x_2,z_2,P),I_2S_2))/3 \tag{7}$$

and $\nabla F(P)$ is the function (7) gradient with respect to P.

The minimum search operation then may include inputting an initial guess for the phase error $P_{err}$ and designated as $$P_{err}^0$$

into the propagation model (equation (2). The initial guess $$P_{err}^0$$

may be zero or some other value which may be a random value. By another alternative, the initial guess may be a phase profile of a lens focused at a certain distance that is some multiple times the focal distances from the SLM being used, such as 10 meters. This has been found to provide a fast convergence versus using all zeros and random numbers, and unlike random noise, this also has been found to lead to phase error $P_{err}$ values that provide smooth (gradual, high quality image content changes in the image) and accurate results. It should be understood that the $P_{err}$ here represents many pixel-level phase errors that may be considered to form a phase error profile for an image.

Next this operation may include computing derivative-based gradients of the loss function at the guess points $$P_{err}^0$$

and making a step of size $\varepsilon_0$ along the gradient of the loss function in the direction opposite to the gradient, which provides the next phase error $P_{err}$ guess point to be inputted into the propagation model equation (1). The next guess point should be closer to a minimum of the loss function. This process of generating a new guess by making a step (-gradient) along the loss function from the previous initial guess point may be as follows:

$$P_{err}^1 = P_{err}^0 - \varepsilon_0 \nabla F(P_{err}^0) \tag{8}$$

where ε is a step selected by a particular algorithm of choice of a skilled practitioner in the field. The step ε is generated according to the gradient descent used, such as a small constant for SGD (such as 0.001 by one example), or fully automatically generated by LBFGS.

Thereafter, the new guess point is compared to a minimum criterium, and if met, the current guess point is set as the solution. The criterium may be a threshold value of the minimized output of the loss function, or the threshold of the gradient magnitude, or, a pre-determined number of steps between 100 and 500, and may be set depending on the gradient descent algorithm used as mentioned herein.

Otherwise, this operation may be repeated where the current guess point becomes the previous guess point in equation (8), and a new gradient is computed to generate a new better guess point on the loss function. This is repeated until a termination criterium is met for each wavelength, each focal plane at a wavelength, and each pixel location of a focal plane being used.

The gradient descent algorithms that may be used include using quasi-Newton gradient descent, limited memory Broyden-Fletcher-Goldfarb-Shanno (LBFGS) algorithms, and/or stochastic gradient descent (SGD). By one form, the F (P) can be derived analytically using a complex number Wirtinger derivative formula providing a real-valued derivative of a real-valued complex function. It has been found that the optimization problem to find phase error $P_{err}$ can be converged in about 300 iterations when using LBFGS with the analytically derived Wirtinger gradient descent, and alternatively, $P_{err}$ was determined in convergence in about 400 iterations using SGD and an automatic differentiation tool such as Pytorch® or Tensorflow®. The gradients determined for the two different tests were found to be very similar. The result may be a 2D array of real numbers between 0 and 2x to form an array of final phase errors per pixel.

Thereafter, the phase error $P_{err}$ of each solved minimum of the loss function for each pixel may be placed into the phase error map. This may be structured as a 2D array or a just a list of the phase errors by pixel location on an index or other similar listing.

It should be noted that in an alternative approach, the images may be downscaled for gradient descent operations so that the phase errors may be computed for key pixel locations at intervals (not every pixel is provided a phase error immediately). The interval may be every other pixel or every fourth pixel, intervals in the x-direction, y-direction, or both, or some other interval found to be efficient. In this case then, the missing pixel phase errors can be interpolated from the key pixels. Such interpolation may be performed on the phase error map before wrapping to 0 to 2π range to avoid interpolation across discontinuities.

Process 800 may include "store phase error for subsequent run-time SLM imaging" 832, where the phase error map be stored in memory as described above and where the map is accessible to an SLM control of a holographic projector.

Figure 9:
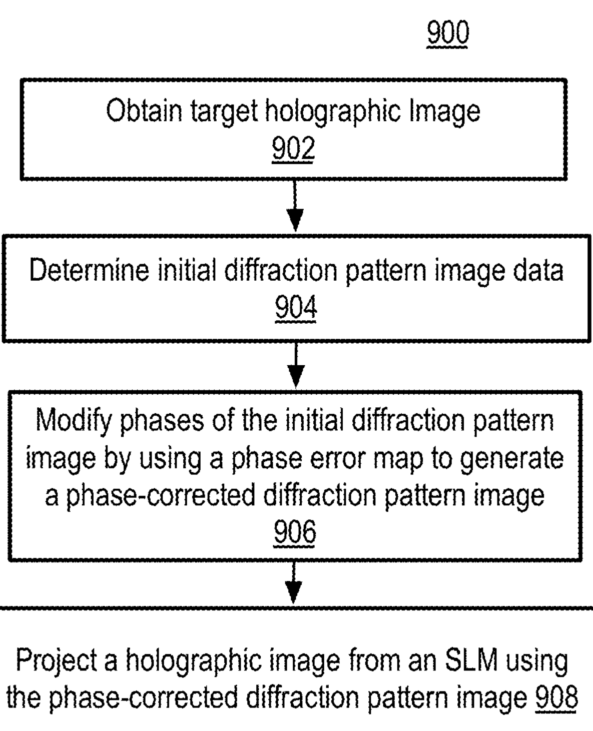
FIG. 9 is a flow chart of a method of holographic image processing with phase error compensation according to at least one of the implementations disclosed herein.

Referring to FIG. 9, a method 900 of holographic image processing with phase error compensation during a run-time is arranged in accordance with at least one of the implementations of the present disclosure. Process 900 may include one or more operations 902-908 generally numbered evenly. By way of non-limiting example, process 900 may form at least part of a holographic imaging process performed by systems 100 and 300 of FIGS. 1 and 3 as discussed herein. Furthermore, process 900 may be described herein with reference to systems 100 and 300.

Process 900 may include "obtain target holographic image" 902, and during run-time this may be any target holographic image for heads up display (HUD), gaming, and so forth, without any limit as to image content.

Process 900 may include "determine initial diffraction pattern image data" 904, and as mentioned above, may involve converting the target image into amplitude and phase profile channels, and inputting the phase values into a CGH algorithm to output initial phase values of the diffraction pattern.

At this point, it should be noted that the hologram system or projector may have a manual or automatic setting to turn the use of the phase error maps on or off at the SLM control when desired. In some cases, the error map may be undesirable when the system is operating in calibration or test mode.

When the phase error map is to be used, process 900 may include "modify phases of the initial diffraction pattern image by using a phase error map to generate a phase-corrected diffraction pattern image" 906. Once a phase error map is available as described in detail above with process 800 (or process 1000 below) for example, the run-time application just subtracts the phase error from the initial phase values of the diffraction pattern image data to generate output pixel phase values for an output diffraction pattern phase profile of an output diffraction pattern image. Each per-pixel phase error value in the phase error map may be wrapped to have a value of 0 to 2π to cover 360 degrees (a wavelength) so that negative sign values are not necessary. When required, the per-pixel phase error wrapped to 0 to 2π may be scaled by a known factor (e.g., divided by 2π) and further quantized into an unsigned integer with 16 or 8 bits for compression purposes. Such quantization operation may include multiplying the value between 0 to 1 by 65535 or 255 and converting from a floating point to unsigned integer format.

Process 900 may include "project a holographic image from an SLM using the phase-corrected diffraction pattern image" 908. Thus, the output phase values or phase profiles than may be used to display the output diffraction pattern image on the SLM and in turn to display the target hologram on an image plane or display.

Figure 10:
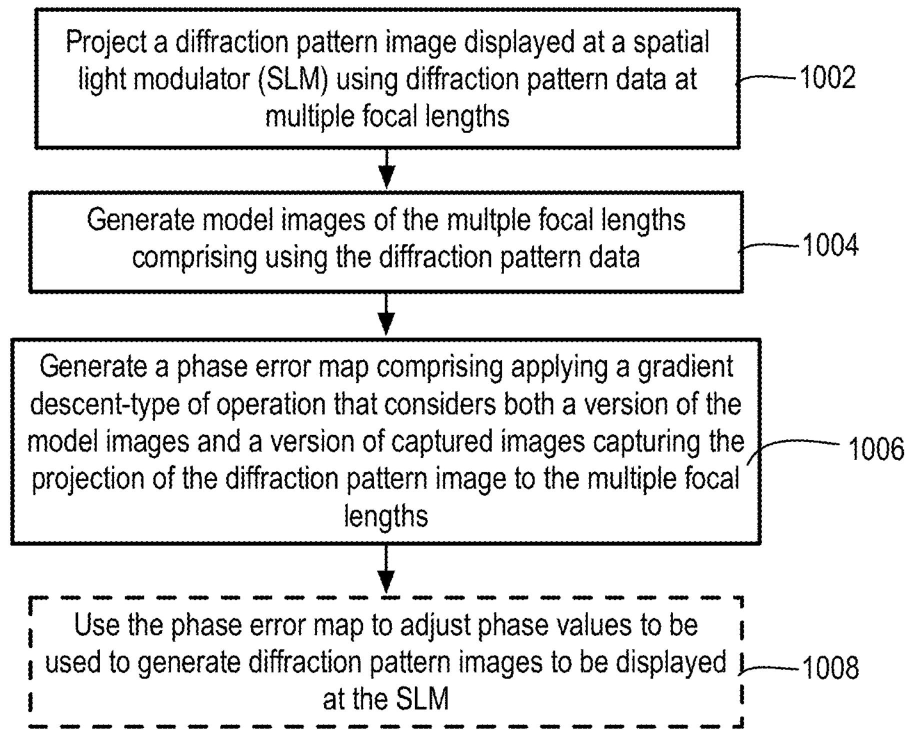
FIG. 10 is a flow chart of another method of holographic image processing with phase error compensation according to at least one of the implementations disclosed herein.

Referring to FIG. 10, an example process 1000 for generating holographic images with phase error compensation is arranged in accordance with at least one of the implementations of the present disclosure. Process 1000 may include one or more operations 1002-1008 generally numbered evenly. By way of non-limiting example, process 1000 may form at least part of a holographic imaging process performed by systems 100 and 300 as discussed herein. Furthermore, process 1000 will be described herein with reference to system 1100 of FIG. 11.

Figure 11:
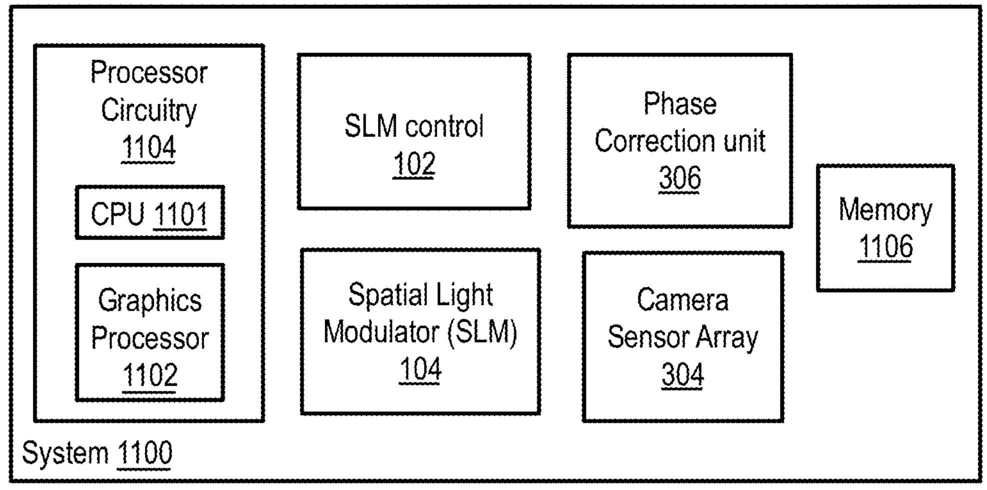
FIG. 11 is an illustrative diagram of an example system for generating holographic images with corrected phase error.

Referring to FIG. 11, an example system 1100 for generating holographic images is arranged in accordance with at least some implementations of the present disclosure. System 1100 includes processor circuitry 1104 with one or more central processing units 1101 (i.e., central processor(s)) and a graphics processing unit 1102 (i.e., graphics processor), memory stores 1106, and SLM 104 or another holographic imaging device. Also as shown, graphics processing unit SLM control 102, SLM 104, camera sensor array 304, and phase correction unit 306. Such modules and logic units may be implemented to perform operations as discussed herein. In the example of system 1100, memory stores 1106 may store phase error maps, target holographic image data, multi-channel image data, initial diffraction pattern image data, output diffraction pattern image data, captured image data, or any other data or data structure discussed herein.

As shown, in some examples, diffraction pattern image data and/or gradient descent computations may be implemented via graphics processing unit 1102. In other examples, one or more or portions of the other units shown may be implemented via central processing units 1101 or an image processing unit (not shown) of system 1100. In yet other examples, one or more or portions of the units of system 1100 shown are implemented via an imaging processing pipeline, graphics pipeline, or the like.

Graphics processing unit 1102 may include any number and type of graphics processing units that may provide the operations as discussed herein. Such operations may be implemented via software, hardware, or a combination thereof. For example, graphics processing unit 1102 may include circuitry dedicated to manipulate holographic image data, DNN data, etc. obtained from memory stores 1106. Central processing units 1101 may include any number and type of processing units or modules that may provide control and other high level functions for system 1100 and/or provide any operations as discussed herein. Memory stores 1106 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory stores 1106 may be implemented by cache memory. In an implementation, one or more or portions of the units of system 1100 may be implemented via an execution unit (EU) of graphics processing unit 1102. The EU may include, for example, programmable logic or circuitry such as a logic core or cores that may provide a wide array of programmable logic functions. In an implementation, dedicated hardware such as fixed function circuitry or the like may be used to perform the computations mentioned herein. Fixed function circuitry may include dedicated logic or circuitry and may provide a set of fixed function entry points that may map to the dedicated logic for a fixed purpose or function. In some implementations, one or more or portions of the units, modules, and components of system 1100 may be implemented via an application specific integrated circuit (ASIC). The ASIC may include an integrated circuitry customized to perform the operations discussed herein.

Process 1000 may include "project a diffraction pattern image displayed at a spatial light modulator (SLM) using diffraction pattern data and at multiple focal lengths" 1002, and this may be performed by system 1100 as described above with operation of calibration stage setup 300 (FIG. 3).

Process 1000 may include "generate model images of the multiple focal lengths comprising using the diffraction pattern data" 1004, and where the model images are non-ideal model images, that may be intensity image versions, that includes phase errors. The model images are obtained from, or in some versions are the embodiment of, the model sensor optical field generated by the propagation model, such as the diffraction, complex number-based convolutional Fresnel propagation model example of equation (1).

Process 1000 may include "generate a phase error map comprising applying a gradient descent-type of operation that considers both a version of the model images and a version of captured images capturing the projection of the diffraction pattern image to the multiple focal lengths" 1006. An example of such gradient descent loss function is provided by example equation (5) above that determines a pixel-level phase error to be placed into the phase error map to be the average phase error when the loss function has been minimized at each focal length being used. Also, the model image or captured image may be adjusted by an energy scale factor since the two images may not have the same energy scale. The details of the types of gradient descent algorithms that can be applied to the loss function by the phase correction unit 306 are described above. The determined final output phase errors may be placed in a phase error map with a phase value for each pixel position.

During a run-time, process 1000 optionally also may include "use the phrase error map to adjust phase values to be used to generate diffraction pattern images to be displayed at the SLM" 1008. Here, the phase error map values are subtracted from the initial phase values or phase profiles of the diffraction pattern data obtained by using CGH algorithms and the data of the target images. The output phase values can then be used to form the output diffraction pattern image data that is provided to the SLM to display the diffraction pattern image at the SLM.

Figure 12:
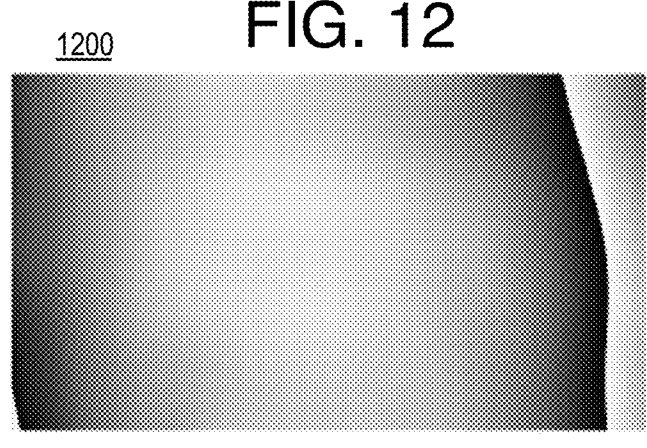
FIG. 12 is an image showing a detected phase error according to at least one implementation disclosed herein.
Figure 13:
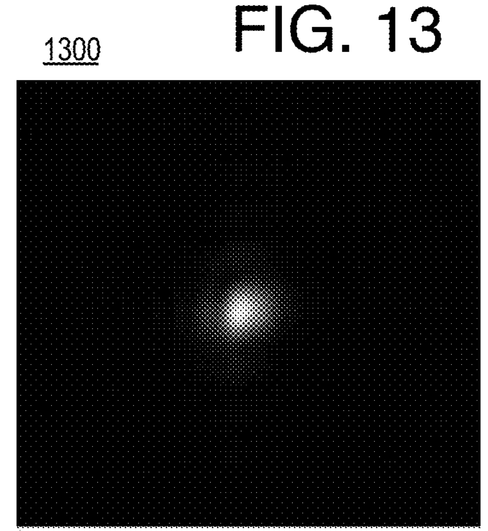
FIG. 13 is an image showing a focus spot before phase error compensation according to at least one implementation disclosed herein.
Figure 14:
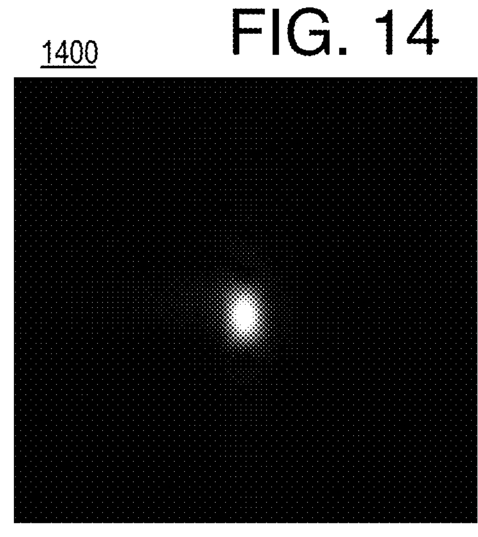
FIG. 14 is an image showing a focus spot after phase error compensation according to at least one implementation disclosed herein.

Referring to FIGS. 12-14 as results of an experiment with the disclosed method and system, a phase error image 1200 represents the detected phase error between an image 1300 displaying a focus spot of a Fresnel lens hologram before compensation, while image 1400 shows the Fresnel lens hologram after phase error compensation using the methods herein. In this experiment, an Himax LCoS SLM was used. The spot on image 900 before compensation is blurry and faded (defocused). After compensation (by subtracting the phase error shown in image 800), the focus spot matches the theoretical (or ideal) shape.

Applied to the test images, after the phase error compensation, contrast ratio (CR) increased by 15% and speckle (image graininess) reduced by 12%. It was found that visible image sharpness also increased.

For example, FIGS. 15A-15B show a test hologram image 1500 with phase error that caused blurriness of the edges of the blocks and lines in the image 1500, while an image 1502 is the result of phase correction according to the methods disclosed herein and shows that the edges of the objects in the image are significantly sharper than in image 1500.

Referring to FIGS. 16-19, testing also showed the benefits of the pre-processing. Images 1600 and 900 were obtained without pre-processing, while images 1800 and 1900 were obtained with pre-processing. Images 1600 and 1800 are captured sensor images and images 900 and 1900 are recovered phase error map images. It can be seen that the captured image 1600 with no pre-processing has significant erroneous artificial increased brightness compared to the captured image 1800 with pre-processing. Also, the phase error map 900 generated without pre-processing shows much more extreme and non-continuous changes in phase compared to the phase error map 1900 with pre-processing.

While implementation of the example processes discussed herein may include the undertaking of all operations shown in the order illustrated, the present disclosure is not limited in this regard and, in various examples, implementation of the example processes herein may include only a subset of the operations shown, operations performed in a different order than illustrated, or additional operations.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more graphics processing unit(s) or processor core(s) may undertake one or more of the blocks of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of the discussed operations, modules, or components discussed herein.

As used in any implementation described herein, the term "module" refers to any combination of software logic, firmware logic, hardware logic, and/or circuitry configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. The modules may, collectively or individually, be embodied as circuitry that forms part of a larger system, for example, an integrated circuit (IC), system on-chip (SoC), and so forth.

As used in any implementation described herein, the term "logic unit" refers to any combination of firmware logic and/or hardware logic configured to provide the functionality described herein. The "hardware", as used in any implementation described herein, may include, for example, singly or in any combination, hardwired circuitry, programmable circuitry, state machine circuitry, and/or firmware that stores instructions executed by programmable circuitry. The logic units may, collectively or individually, be embodied as circuitry that forms part of a larger system, for example, an integrated circuit (IC), system on-chip (SoC), and so forth. For example, a logic unit may be embodied in logic circuitry for the implementation firmware or hardware of the coding systems discussed herein. One of ordinary skill in the art will appreciate that operations performed by hardware and/or firmware may alternatively be implemented via software, which may be embodied as a software package, code and/or instruction set or instructions, and also appreciate that logic unit may also utilize a portion of software to implement its functionality.

As used in any implementation described herein, the term "component" may refer to a module or to a logic unit, as these terms are described above. Accordingly, the term "component" may refer to any combination of software logic, firmware logic, and/or hardware logic configured to provide the functionality described herein. For example, one of ordinary skill in the art will appreciate that operations performed by hardware and/or firmware may alternatively be implemented via a software module, which may be embodied as a software package, code and/or instruction set, and also appreciate that a logic unit may also utilize a portion of software to implement its functionality. Component herein also may refer to processors and other specific hardware devices.

The terms "circuit" or "circuitry," as used in any implementation herein, may comprise or form, for example, singly or in any combination, hardwired circuitry, programmable circuitry such as computer processors comprising one or more individual instruction processing cores, state machine circuitry, and/or firmware that stores instructions executed by programmable circuitry. The circuitry may include a processor ("processor circuitry") and/or controller configured to execute one or more instructions to perform one or more operations described herein. The instructions may be embodied as, for example, an application, software, firmware, etc. configured to cause the circuitry to perform any of the aforementioned operations. Software may be embodied as a software package, code, instructions, instruction sets and/or data recorded on a computer-readable storage device. Software may be embodied or implemented to include any number of processes, and processes, in turn, may be embodied or implemented to include any number of threads, etc., in a hierarchical fashion. Firmware may be embodied as code, instructions or instruction sets and/or data that are hard-coded (e.g., nonvolatile) in memory devices. The circuitry may, collectively or individually, be embodied as circuitry that forms part of a larger system, for example, an integrated circuit (IC), an application-specific integrated circuit (ASIC), a system-on-a-chip (SoC), desktop computers, laptop computers, tablet computers, servers, smartphones, etc. Other implementations may be implemented as software executed by a programmable control device. In such cases, the terms "circuit" or "circuitry" are intended to include a combination of software and hardware such as a programmable control device or a processor capable of executing the software. As described herein, various implementations may be implemented using hardware elements, software elements, or any combination thereof that form the circuits, circuitry, processor circuitry. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Figure 20:
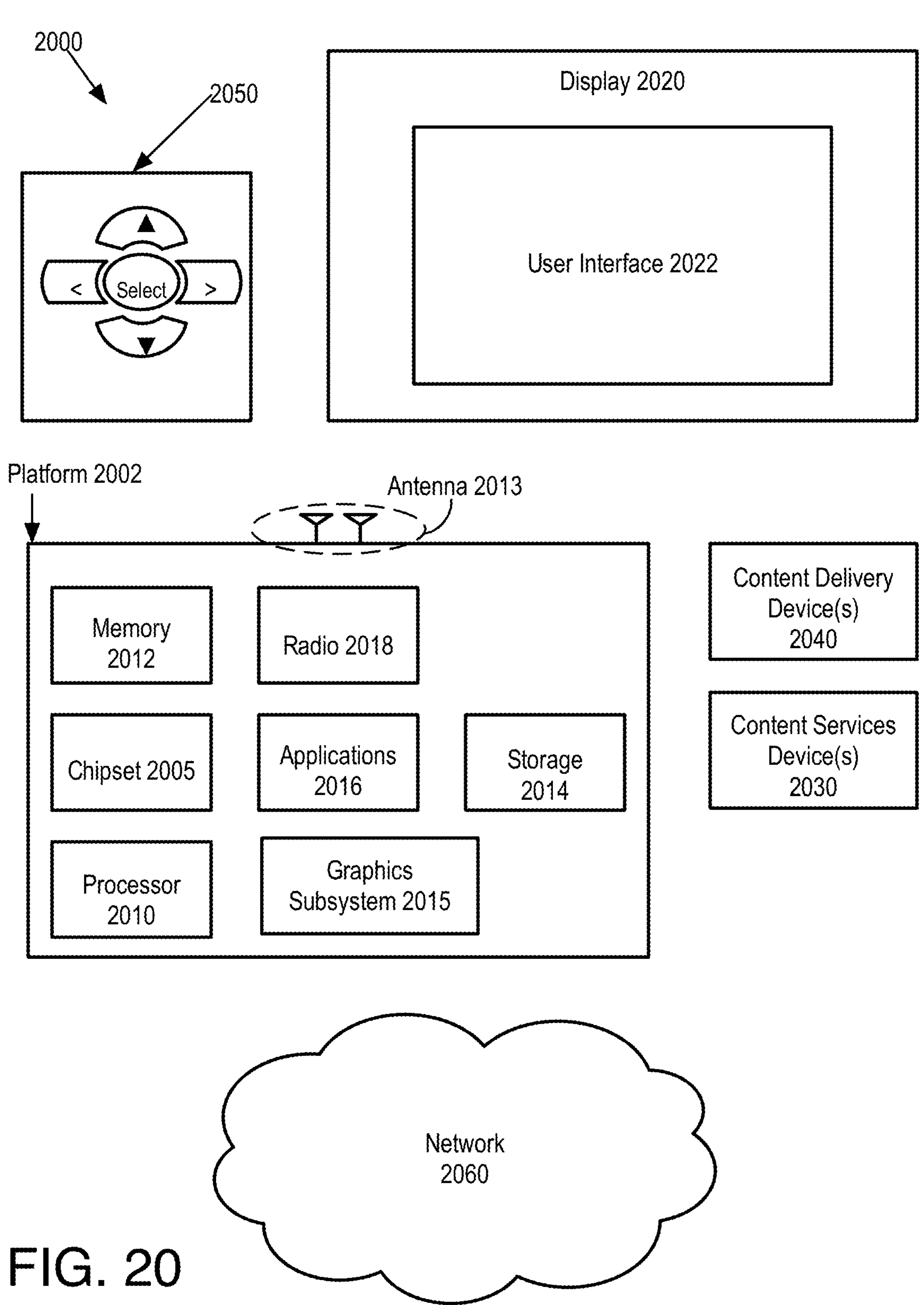
FIG. 20 is an illustrative diagram of an example system.

Referring to FIG. 20 is an illustrative diagram of an example system 2000, arranged in accordance with at least some implementations of the present disclosure. In various implementations, system 2000 may be a computing system although system 2000 is not limited to this context. For example, system 2000 may be incorporated into a personal computer (PC), laptop computer, ultra-laptop computer, tablet, phablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, peripheral device, gaming console, wearable device, display device, all-in-one device, two-in-one device, and so forth.

In various implementations, system 2000 includes a platform 2002 coupled to a display 2020. Platform 2002 may receive content from a content device such as content services device(s) 2030 or content delivery device(s) 2040 or other similar content sources such as a camera or camera module or the like. A navigation controller 2050 including one or more navigation features may be used to interact with, for example, platform 2002 and/or display 2020. Each of these components is described in greater detail below.

In various implementations, platform 2002 may include any combination of a chipset 2005, processor 2010, memory 2012, antenna 2013, storage 2014, graphics subsystem 2015, applications 2016, and/or radio 2018. Chipset 2005 may provide intercommunication among processor 2010, memory 2012, storage 2014, graphics subsystem 2015, applications 2016 and/or radio 2018. For example, chipset 2005 may include a storage adapter (not depicted) capable of providing intercommunication with storage 2014.

Processor 2010 may be implemented as a Complex Instruction Set Computer (CISC) or Reduced Instruction Set Computer (RISC) processors, x86 instruction set compatible processors, multi-core, or any other microprocessor or central processing unit (CPU). In various implementations, processor 2010 may be dual-core processor(s), dual-core mobile processor(s), and so forth.

Memory 2012 may be implemented as a volatile memory device such as, but not limited to, a Random Access Memory (RAM), Dynamic Random Access Memory (DRAM), or Static RAM (SRAM).

Storage 2014 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 2014 may include technology to increase the storage performance enhanced protection for valuable digital media when multiple hard drives are included, for example.

Graphics subsystem 2015 may perform processing of images such as still images, graphics, or video for display. Graphics subsystem 2015 may be a graphics processing unit (GPU), a visual processing unit (VPU), or an image processing unit, for example. In some examples, graphics subsystem 2015 may perform holographic image processing as discussed herein. An analog or digital interface may be used to communicatively couple graphics subsystem 2015 and display 2020. For example, the interface may be any of a High-Definition Multimedia Interface, DisplayPort, wireless HDMI, and/or wireless HD compliant techniques. Graphics subsystem 2015 may be integrated into processor 2010 or chipset 2005. In some implementations, graphics subsystem 2015 may be a stand-alone device communicatively coupled to chipset 2005.

The image processing techniques described herein may be implemented in various hardware architectures. For example, image processing functionality may be integrated within a chipset. Alternatively, a discrete graphics and/or image processor and/or application specific integrated circuit may be used. As still another implementation, the image processing may be provided by a general purpose processor, including a multi-core processor. In further implementations, the functions may be implemented in a consumer electronics device.

Radio 2018 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 2018 may operate in accordance with one or more applicable standards in any version.

In various implementations, display 2020 may include any flat panel monitor or display. Display 2020 may include, for example, a computer display screen, touch screen display, video monitor, television-like device, and/or a television. Display 2020 may be digital and/or analog. In various implementations, display 2020 may be a holographic display. Also, display 2020 may be a transparent surface that may receive a visual projection. Such projections may convey various forms of information, images, and/or objects. For example, such projections may be a visual overlay for a mobile augmented reality (MAR) application. Under the control of one or more software applications 2016, platform 2002 may display user interface 2022 on display 2020.

In various implementations, content services device(s) 2030 may be hosted by any national, international and/or independent service and thus accessible to platform 2002 via the Internet, for example. Content services device(s) 2030 may be coupled to platform 2002 and/or to display 2020. Platform 2002 and/or content services device(s) 2030 may be coupled to a network 2060 to communicate (e.g., send and/or receive) media information to and from network 2060. Content delivery device(s) 2040 also may be coupled to platform 2002 and/or to display 2020.

In various implementations, content services device(s) 2030 may include a cable television box, personal computer, network, telephone, Internet enabled devices or appliance capable of delivering digital information and/or content, and any other similar device capable of uni-directionally or bi-directionally communicating content between content providers and platform 2002 and/display 2020, via network 2060 or directly. It will be appreciated that the content may be communicated uni-directionally and/or bi-directionally to and from any one of the components in system 2000 and a content provider via network 2060. Examples of content may include any media information including, for example, video, music, medical and gaming information, and so forth.

Content services device(s) 2030 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 2002 may receive control signals from navigation controller 2050 having one or more navigation features. The navigation features of navigation controller 2050 may be used to interact with user interface 2022, for example. In various implementations, navigation controller 2050 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of navigation controller 2050 may be replicated on a display (e.g., display 2020) by movements of a pointer, cursor, focus ring, or other visual indicators displayed on the display. For example, under the control of software applications 2016, the navigation features located on navigation controller 2050 may be mapped to virtual navigation features displayed on user interface 2022, for example. In various implementations, navigation controller 2050 may not be a separate component but may be integrated into platform 2002 and/or display 2020. The present disclosure, however, is not limited to the elements or in the context shown or described herein.

In various implementations, drivers (not shown) may include technology to enable users to instantly turn on and off platform 2002 like a television with the touch of a button after initial boot-up, when enabled, for example. Program logic may allow platform 2002 to stream content to media adaptors or other content services device(s) 2030 or content delivery device(s) 2040 even when the platform is turned "off." In addition, chipset 2005 may include hardware and/or software support for 5.1 surround sound audio and/or high definition 20.1 surround sound audio, for example. Drivers may include a graphics driver for integrated graphics platforms. In various implementations, the graphics driver may include a peripheral component interconnect (PCI) Express graphics card.

In various implementations, any one or more of the components shown in system 2000 may be integrated. For example, platform 2002 and content services device(s) 2030 may be integrated, or platform 2002 and content delivery device(s) 2040 may be integrated, or platform 2002, content services device(s) 2030, and content delivery device(s) 2040 may be integrated, for example. In various implementations, platform 2002 and display 2020 may be an integrated unit. Display 2020 and content service device(s) 2030 may be integrated, or display 2020 and content delivery device(s) 2040 may be integrated, for example. These examples are not meant to limit the present disclosure.

In various implementations, system 2000 may be implemented as a wireless system, a wired system, or a combination of both. When implemented as a wireless system, system 2000 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 2000 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 2002 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The implementations, however, are not limited to the elements or in the context shown or described in FIG. 20.

Figure 21:
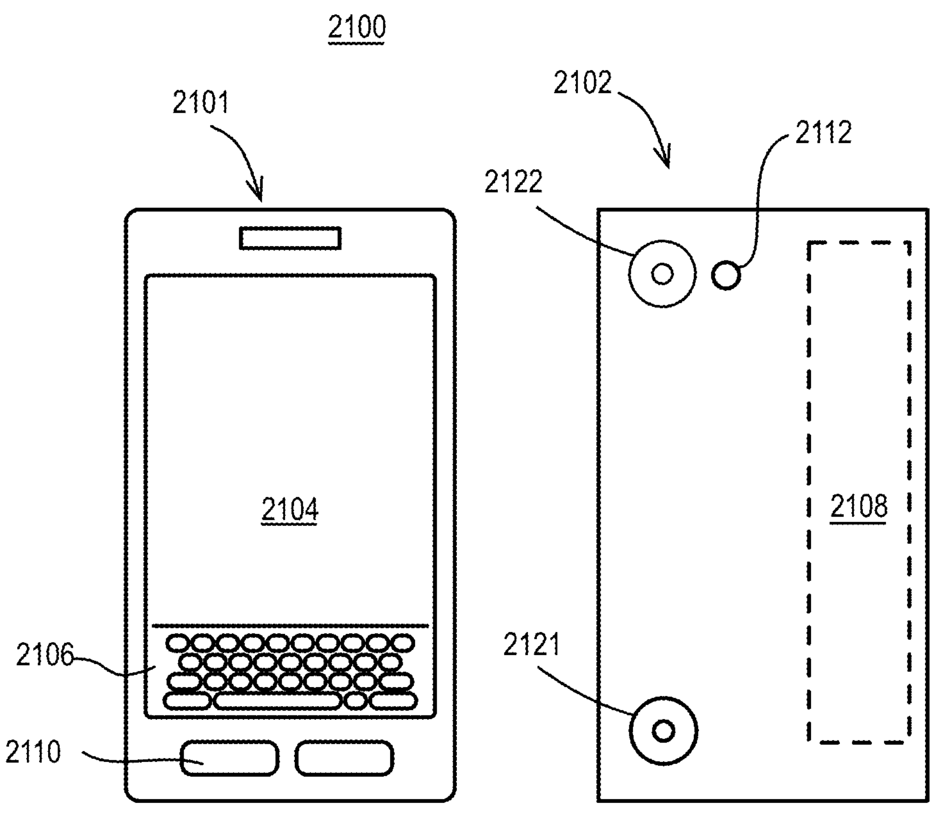
FIG. 21 illustrates an example device, all arranged in accordance with at least some implementations of the present disclosure.

As described above, system 100, 200, 300, 1900, or 2000 may be embodied in varying physical styles or form factors. FIG. 21 illustrates an example small form factor device 2100, arranged in accordance with at least some implementations of the present disclosure. In some examples, system 100, 200, 300, 1900, or 2000 may be implemented via device 2100. In various implementations, for example, device 2100 may be implemented as a holographic projector or remote control or remote image processing device for a holographic projector or other mobile computing device having wireless capabilities as described above. A mobile computing device may refer to any device having a processing system and a mobile power source or supply, such as one or more batteries, for example.

Examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, smart device (e.g., smart phone, smart tablet or smart mobile television), mobile internet device (MID), messaging device, data communication device, cameras, and so forth.

Examples of a mobile computing device also may include computers that are arranged to be worn by a person, such as a wrist computer, finger computers, ring computers, eyeglass computers, belt-clip computers, arm-band computers, shoe computers, clothing computers, and other wearable computers. In various implementations, for example, a mobile computing device may be implemented as a smart phone capable of executing computer applications, as well as voice communications and/or data communications. Although some implementations may be described with a mobile computing device implemented as a smart phone by way of example, it may be appreciated that other implementations may be implemented using other wireless mobile computing devices as well. The implementations are not limited in this context.

As shown in FIG. 21, device 2100 may include a housing with a front 2101 and a back 2102. Device 2100 includes a display 2104, an input/output (I/O) device 2106, and an integrated antenna 2108. Device 2100 also may include navigation features 2110. I/O device 2106 may include any suitable I/O device for entering information into a mobile computing device. Examples for I/O device 2106 may include an alphanumeric keyboard, a numeric keypad, a touch pad, input keys, buttons, switches, microphones, speakers, voice recognition device and software, and so forth. Information also may be entered into device 2100 by way of microphone (not shown), or may be digitized by a voice recognition device. As shown, device 2100 may include one or more cameras 2122 and 2121 (e.g., including a lens, an aperture, and an imaging sensor) and a flash 2112 integrated into back 2102 (or elsewhere) of device 2100. In other examples, camera 2122 and flash 2112 may be integrated into front 2101 of device 2100 or both front and back cameras may be provided. Camera 2122 and flash 2112 may be components of a camera module to originate image data processed into streaming video that is output to display 2104 and/or communicated remotely from device 2100 via antenna 2108 for example.

Various implementations may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an implementation is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one implementation may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The following examples pertain to further implementations.

In an example 1, a method for generating holographic images comprising projecting a diffraction pattern image displayed at a spatial light modulator (SLM) using diffraction pattern data and at multiple focal lengths; generating model images of the multiple focal lengths comprising using the diffraction pattern data; and generating a phase error map comprising applying a gradient descent-type of operation that considers both a version of the model images and a version of captured images capturing the projection of the diffraction pattern image to the multiple focal lengths.

In an example 2, the subject matter of example 1 wherein the generating of the phase error map occurs during a calibration stage, and the method comprising using the phase error map during a run-time to adjust phase values to be used to generate diffraction pattern image data of one or more diffraction pattern images to be displayed at the SLM.

In example 3, the subject matter of example 1 or 2 wherein the model images are non-ideal model images that include a phase error.

In example 4, the subject matter of any one of examples 1 to 3 wherein generating the model images comprises inputting a phase profile of the diffraction pattern data into an optical field propagation model.

In example 5, the subject matter of any one of examples 1 to 4 wherein generating the model images comprises inputting the diffraction pattern data into an optical field propagation model that is based on a convolutional Fresnel diffraction algorithm using complex numbers.

In example 6, the subject matter of any one of examples 1 to 5 wherein generating the model images comprises operating a propagation model to generate model sensor optical fields that are each a model of an image captured at the sensor array and that is convertible to the model images.

In example 7, the subject matter of example 6 wherein the method comprises converting the model sensor optical field into an intensity image to form the model image.

In example 8, the subject matter of any one of examples 1 to 7 wherein the gradient descent-type of operation considers both pixel values of the model images and pixel values of the captured images, and generates a phase error map as an output at individual iterations of the gradient descent.

In example 9, the subject matter of any one of examples 1 to 8 wherein the method comprises pre-processing the captured images before performing gradient descent with the captured images comprising performing vibration compensation and denoising.

In example 10, a system for generating holographic images comprising: memory to store holographic image data and phase errors; and processor circuitry coupled to the memory and forming at least one processor to operate by: receiving holographic captured images of multiple different focal lengths extending from a spatial light modulator (SLM) displaying diffraction pattern images projected to be captured in the captured images; generating pre-processed holographic image data of the captured images comprising: applying vibration compensation to the captured images, and denoising the image data comprising subtracting a noise estimation from image data of the captured images; and generating a phase error map comprising considering both the pre-processed holographic image data of the captured images and model images generated by using data used to form the diffraction pattern images.

In example 11, the subject matter of claim 10 wherein the vibration compensation comprises aligning image content of multiple images of the same focal length to image content of a single anchor image.

In example 12, the subject matter of claim 11 wherein the vibration compensation comprises adjusting the multiple images by an average vibration shift in image content position within an image and generated by determining the shift of image content in the anchor image to the individual multiple images.

In example 13, the subject matter of example 12 wherein the vibration compensation comprises determining a tilt mis-alignment shift of a sensor array of a camera providing the captured images relative to the SLM and adding the tilt mis-alignment shift to the vibration shift to adjust image data of the multiple images.

In example 14, the subject matter of any one of examples 10 to 13 wherein the denoising comprises averaging the image data of multiple captured images at the same focal length to form an average captured image to be used to generate the phase error map.

In example 15, the subject matter of example 14 wherein the denoising comprises subtracting an average noise estimate from image data of pixel locations on the average captured image.

In example 16, the subject matter of any one of examples 10 to 15 wherein generating the phase error map comprises using a gradient descent-type of operation considering both the pre-processed holographic image data of the captured images and the model images.

In example 17, the subject matter of any one of examples 10 to 16 wherein the at least one processor is arranged to operate by using the phase error map to adjust phase values to be used to generate diffraction pattern image data of one or more diffraction pattern images to be displayed at the SLM.

In example 18, at least one non-transitory machine readable medium comprising a plurality of instructions that, in response to being executed on a computing device, cause the computing device to operate by: projecting a diffraction pattern image displayed at a spatial light modulator (SLM) using diffraction pattern data and at multiple focal lengths; generating model images of the multiple focal lengths comprising using the diffraction pattern data; generating holographic captured images comprising capturing the projection of the diffraction pattern image to the multiple focal lengths; and generating a phase error map comprising applying a gradient descent-type of operation that considers both a version of the model images and a version of the captured images.

In example 19, the subject matter of example 18 wherein generating the model image comprises inputting at least one latest phase error guess into a propagation model that generates a model sensor optical field convertible into the model image, wherein the phase error guess is obtained at iterations from the gradient descent-type operation.

In example 20, the subject matter of example 19 wherein the at least one latest phase error guess is a phase error map of multiple phase errors.

In example 21, the subject matter of any one of examples 18 to 20 wherein the gradient descent-type of operation determines phase errors for the phase error map as the phase errors resulting in the average total minimum mean square error (MSE) between the captured images and the model images at the multiple focal lengths.

In example 22, the subject matter of any one of examples 18 to 21 wherein the instructions cause the computing device to operate by performing pre-processing on the captured images comprising vibration compensation and denoising before using the captured images for gradient descent.

In example 23, the subject matter of any one of examples 18 to 22 wherein the gradient descent-type of operation is performed by starting with an initial phase error guess that is based on a phase profile of an image with a focal length longer than all of the multiple focal lengths.

In example 24, the subject matter of any one of examples 18 to 23 wherein the gradient descent-type of operation modifies either the captured images or the model images of each focal length and contributing to the same phase error minimum value and modified with at least one scaling energy factor.

In example 25, the subject matter of any one of examples 18 to 24 wherein the model images are generated by using SLM parameters to generate a phase profile considered to be ideal with no phase error, and rather than using an input target image.

In example 26, at least one machine readable medium includes a plurality of instructions that in response to being executed on a computing device, cause the computing device to perform a method according to any one of the above implementations.

In example 27, an apparatus may include means for performing a method according to any one of the above implementations.

The above examples may include specific combination of features. However, the above examples are not limited in this regard and, in various implementations, the above examples may include undertaking only a subset of such features, undertaking a different order of such features, undertaking a different combination of such features, and/or undertaking additional features than those features explicitly listed. For example, all features described with respect to any example methods herein may be implemented with respect to any example apparatus, example systems, and/or example articles, and vice versa.

What is claimed is:

1. A method for generating holographic images, the method comprising:

projecting, during calibration, first diffraction pattern images displayed at a spatial light modulator (SLM), the first diffraction pattern images based on first diffraction pattern data, the first diffraction pattern images associated with multiple focal lengths;

generating, during the calibration, model images associated with the multiple focal lengths based on the first diffraction pattern data;

generating, during the calibration, a phase error map based on the model images and captured images of the projected first diffraction pattern images, the captured images associated with the multiple focal lengths; and adjusting, during run-time, phase values based on the phase error map, the phase values used to generate second diffraction pattern data for one or more second diffraction pattern images.

2. The method of claim 1, wherein the model images are non-ideal model images that include a phase error.

3. The method of claim 1, wherein the generating of the model images includes inputting a phase profile of the first diffraction pattern data into an optical field propagation model.

4. The method of claim 1, wherein the generating of the model images includes inputting the first diffraction pattern data into an optical field propagation model that is based on a convolutional Fresnel diffraction algorithm.

5. The method of claim 1, wherein the generating of the model images includes operating a propagation model to generate a model sensor optical field that models an image captured at a sensor array.

6. The method of claim 5, including converting the model sensor optical field into an intensity image to form a first one of the model images.

7. The method of claim 1, wherein the generating of the phase error map is based on a gradient descent operation, the gradient descent operation based on pixel values of the model images and pixel values of the captured images, the gradient descent operation to generate the phase error map iteratively.

8. The method of claim 1, including pre-processing the captured images before generating the phase error map based on the captured images, the pre-processing including vibration compensation and denoising.

9. The method of claim 1, wherein the generating of the phase error map is based on a gradient descent operation.

10. A system comprising:

memory to store holographic image data and phase errors;

instructions; and at least one processor circuit to be programmed based on the instructions to:

obtain holographic captured images associated with multiple different focal lengths from a spatial light modulator (SLM), the SLM to display diffraction pattern images;

apply vibration compensation to the captured images to generate pre-processed holographic image data, the vibration compensation based on alignment of image content of multiple captured images associated with a same focal length to image content of an anchor image; and generate a phase error map based on the pre-processed holographic image data and model images, the model images based on data to form the diffraction pattern images.

11. The system of claim 10, wherein one or more of the at least one processor circuit is to apply the vibration compensation by adjusting the multiple captured images by an average vibration shift, the average vibration shift based on shifts of the image content in the anchor image relative to the image content of respective ones of the multiple captured images.

12. The system of claim 11, wherein one or more of the at least one processor circuit is to apply the vibration compensation by:

determining a tilt mis-alignment shift of a sensor array of a camera relative to the SLM, the camera to provide the captured images; and adding the tilt mis-alignment shift to the average vibration shift to adjust the image content of the multiple captured images.

13. The system of claim 10, wherein one or more of the at least one processor circuit is to average the image content of the multiple captured images at the same focal length to form an average captured image to be used to generate the phase error map.

14. The system of claim 13, wherein one or more of the at least one processor circuit is to subtract an average noise estimate from image data of pixel locations of the average captured image.

15. The system of claim 10, wherein one or more of the at least one processor circuit is to generate the phase error map based on a gradient descent operation, the gradient descent operation based on the pre-processed holographic image data $\phi$ and the model images.

16. The system of claim 10, wherein the diffraction pattern images are first diffraction pattern images, and one or more of the at least one processor circuit is to adjust phase values based on the phase error map, the phase values to be used to generate diffraction pattern image data of one or more second diffraction pattern images to be displayed at the SLM.

17. The system of claim 10, wherein one or more of the at least one processor circuit is to subtract estimated noise from the captured images.

18. At least one non-transitory machine readable medium comprising a plurality of instructions to cause at least one processor circuit of a computing device to at least:

cause projection of diffraction pattern images displayed at a spatial light modulator (SLM), the diffraction pattern images based on diffraction pattern data, the diffraction pattern images associated with at multiple focal lengths;

generate model images associated with the multiple focal lengths based on the diffraction pattern data, a model image of the model images generated based on at least one phase error guess input into a propagation model that generates a model sensor optical field, the model sensor optical field convertible into the model image, the phase error guess obtained iteratively from a gradient descent operation;

obtain holographic captured images of the projected diffraction pattern images, the captured images associated with the multiple focal lengths; and generate a phase error map based on the gradient descent operation, the gradient descent operation based on the model images and the captured images.

19. The medium of claim 18, wherein the instructions are to cause one or more of the at least one processor circuit to include a latest phase error guess in the phase error map.

20. The medium of claim 18, wherein the gradient descent-type of operation determines phase errors for the phase error map based on an average total minimum mean square error (MSE) between the captured images and the model images at the multiple focal lengths.

21. The medium of claim 18, wherein the instructions are to cause one or more of the at least one processor circuit to perform pre-processing on the captured images, the pre-processing including vibration compensation and denoising, the pre-processing performed before the captured images are processed by the gradient descent operation.

22. The medium of claim 18, wherein the instructions are to cause one or more of the at least one processor circuit to initialize the gradient descent operation with an initial phase error guess, the initial phase error guess based on a phase profile of an image with a focal length longer than the multiple focal lengths.

23. The medium of claim 18, wherein the gradient descent operation modifies at least one of the captured images or the model images based on at least one energy scaling factor.

24. The medium of claim 18, wherein the instructions are to cause one or more of the at least one processor circuit to generate the model images based on SLM parameters that generate a phase profile with no phase error.

* * * * *